United States Patent
Prasad et al.

(10) Patent No.: US 7,197,125 B1
(45) Date of Patent: Mar. 27, 2007

(54) METHOD AND APPARATUS FOR SELECTING AND MANAGING WIRELESS NETWORK SERVICES USING A DIRECTORY

(75) Inventors: Ranjan Prasad, Fremont, CA (US); Ramprasad Golla, Milpitas, CA (US); Vijayaraghavan Parthasarathy, Plesanton, CA (US); Max Lou, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 693 days.

(21) Appl. No.: 09/800,646

(22) Filed: Mar. 6, 2001

(51) Int. Cl.
*H04M 3/42* (2006.01)
(52) U.S. Cl. .............................. 379/201.02; 379/201.03
(58) Field of Classification Search ................ 379/201.02–201.05, 201.12
See application file for complete search history.

(56) References Cited

U.S. PATENT DOCUMENTS

| | | | | |
|---|---|---|---|---|
| 5,206,899 A | * | 4/1993 | Gupta et al. ................. | 379/120 |
| 6,018,570 A | * | 1/2000 | Matison ................... | 379/207.15 |
| 6,031,904 A | * | 2/2000 | An et al. ................. | 379/201.02 |
| 6,064,990 A | * | 5/2000 | Goldsmith .................... | 705/75 |
| 6,160,877 A | * | 12/2000 | Tatchell et al. ............. | 379/197 |
| 6,173,438 B1 | * | 1/2001 | Kodosky et al. ............. | 717/109 |
| 6,219,790 B1 | * | 4/2001 | Lloyd et al. ................ | 713/201 |
| 6,324,271 B1 | * | 11/2001 | Sawyer et al. ......... | 379/142.05 |
| 6,622,016 B1 | * | 9/2003 | Sladek et al. .......... | 379/201.01 |
| 2002/0116396 A1 | * | 8/2002 | Somers et al. .............. | 707/200 |

\* cited by examiner

*Primary Examiner*—Harry S. Hong
(74) *Attorney, Agent, or Firm*—Hickman Palermo Troung & Becker LLP

(57) ABSTRACT

A method and apparatus are disclosed for modifying a subscription of a subscriber to a telecommunications service based on subscriber information and service information that are stored in a directory repository. A directory-enabled service selection framework is coupled to the directory repository for receiving stored information therefrom. The directory-enabled service selection framework receives a request to identify one or more services to which a subscriber is subscribed, based on a prior request to modify the subscription of the subscriber to the telecommunications service. A list is generated of the one or more services to which the subscriber is currently subscribed, based on group membership of the subscriber, one or more roles occupied by the subscriber, and authorization information associated with the subscriber that is stored in the directory repository. Individual service information is generated for each of the one or more services in the list, based on subscriber information and service information that is stored in the directory repository, for use in automatically subscribing the subscriber to a service that is represented by the individual service information. Accordingly, using user information and service information in a directory, a user is automatically subscribed to network services and logged into services.

47 Claims, 11 Drawing Sheets

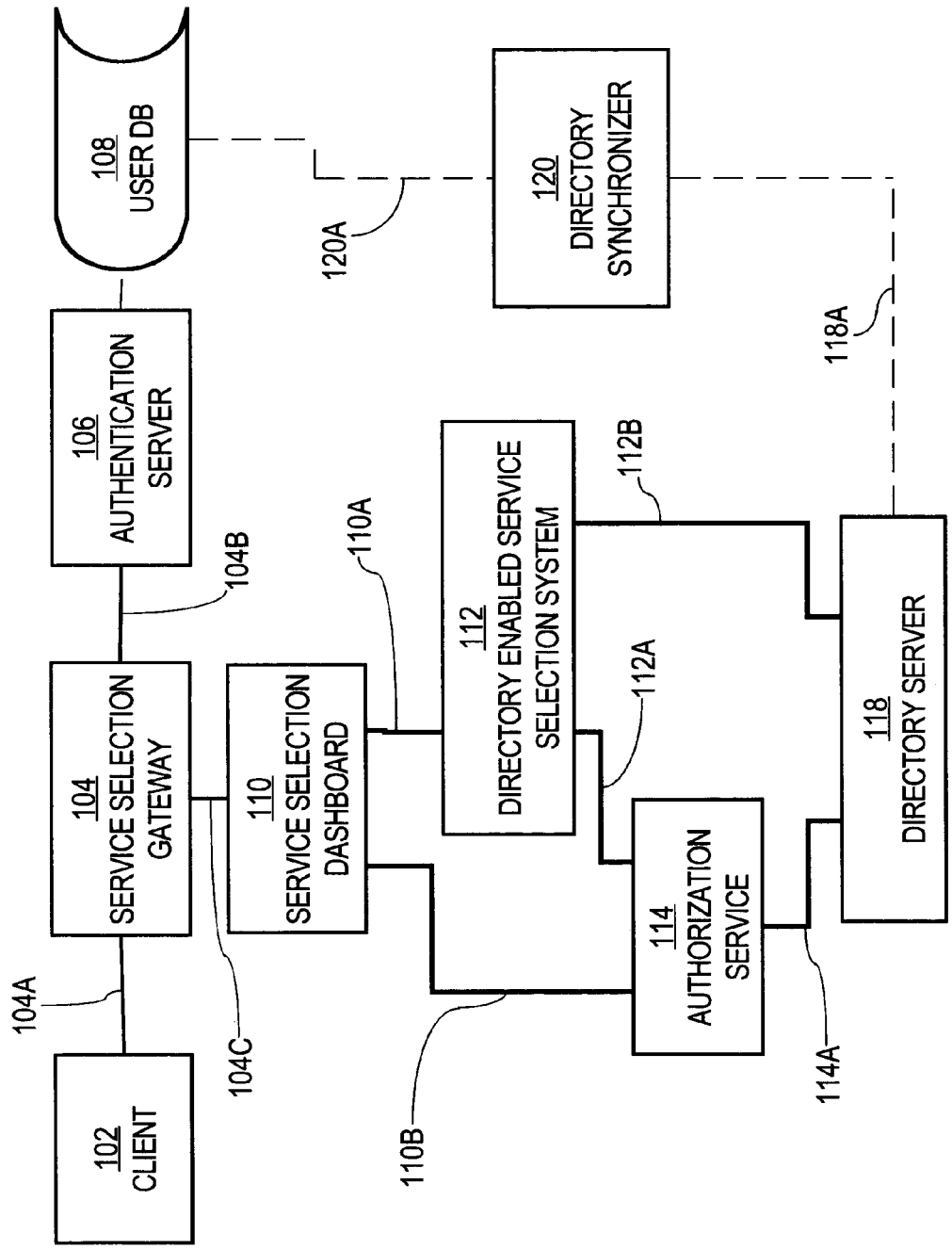

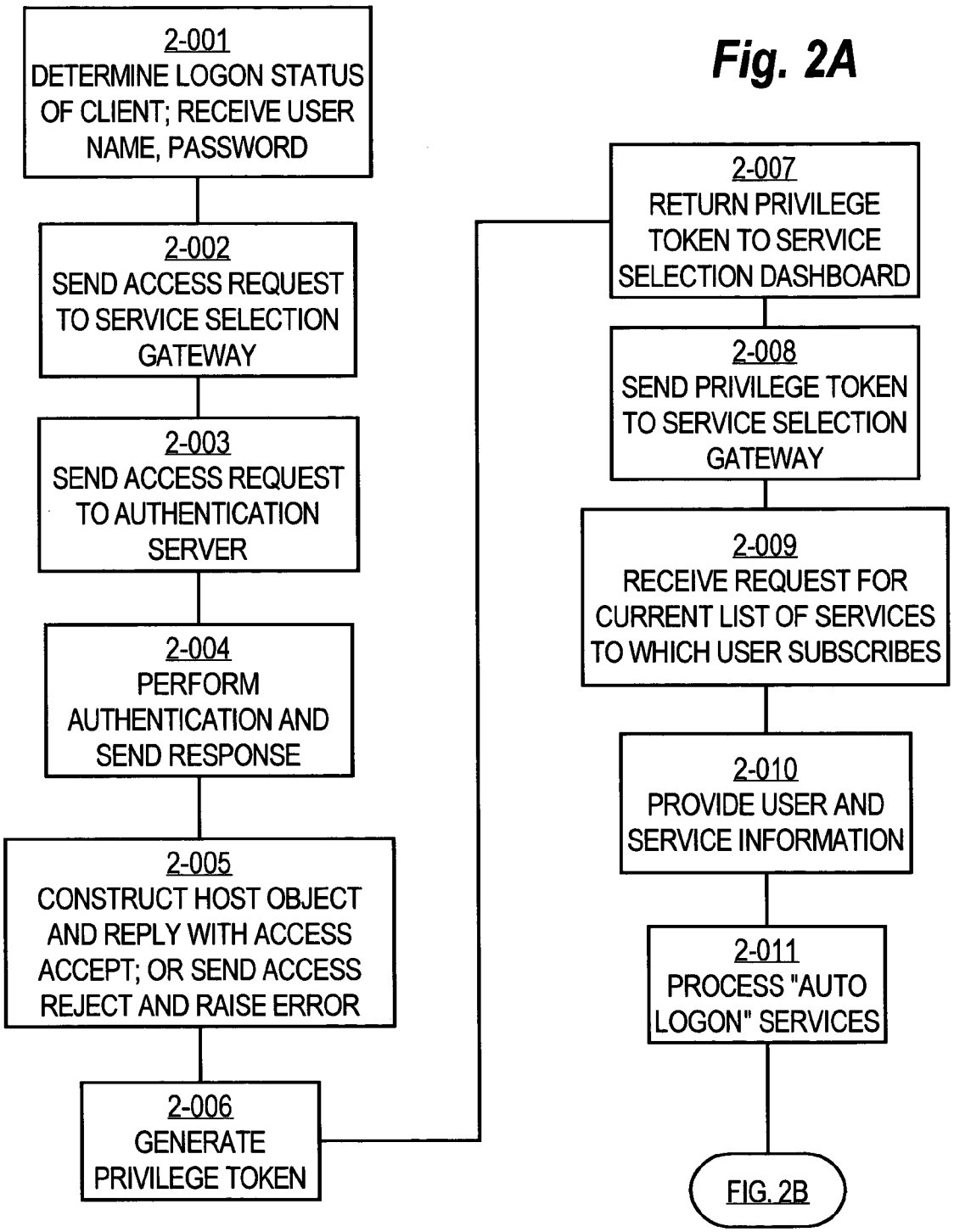

METHOD AND APPARATUS FOR SELECTING AND MANAGING WIRELESS NETWORK SERVICES USING A DIRECTORY

FIELD OF INVENTION

The present invention generally relates to computer network management. The invention relates more specifically to methods, apparatus and products for creating and managing network services useful for wireless personal digital assistants, cellular telephones and like devices.

BACKGROUND OF THE INVENTION

Advanced network services are becoming increasingly available for the benefit of users of wireless handheld personal digital assistants, cellular telephones, and other mobile computing devices. In one approach, services for a particular subscriber are selected using a Service Selection Dashboard software element that communicates with a Service Selection Gateway software element. Using the Service Selection Dashboard, an administrator or technician selects one or more services and one or more service configuration parameters for a particular user. When service selection is complete, the Service Selection Dashboard transmits an information profile describing the selected services to the Service Selection Gateway, which notifies all other network elements that need to know about the subscriber and the selected services.

An example of this approach is found in the Service Selection Gateway product as implemented using the Cisco 6400 Access Concentrator of Cisco Systems, Inc. San Jose, Calif. The Cisco Service Selection Gateway (SSG) is a software module that works with the Cisco Internetworking Operating System (IOS®) and is executed by a network device, typically a high-end router. The SSG enables service providers to provide services such as videoconferencing, streaming video, personalized Internet, business-grade Internet, shopping, and gaming.

Although this approach is useful, it has limitations. For example, service subscription and other management functions are carried out with respect to individual users. However, users are often organized in logical groups, and there is a need to carry out service subscription for entire groups at one time. For example, there is a need to assign a default set of services to a group of users based on a specified subscription level. Group subscription is not available in current approaches.

Another problem of the prior approach is that service selection is not dynamic. If a user subscribes to a new service, it is not available unless the user logs in again. Internally, this is because a host object that represents the user's services is built once when the user is successfully authenticated at login, and is not updated thereafter until the user logs in again.

Still another problem is that user management is cumbersome. A service publisher cannot enable a group of users for a particular service. Service enablement is carried out on a user-by-user basis. There is no bulk administration of users.

Yet another problem is the lack of an authorization model. Any user can subscribe to any service. In order to provide differentiated services, an authorization model is essential.

Still a further problem is lack of a mechanism to create subordinate accounts. Subordinate account creation and management, as well as parental blocks, require an authorization system.

Based on the foregoing, there is a clear need for an improved service selection and management system that provides authentication functions and that can overcome the disadvantages set forth herein.

SUMMARY OF THE INVENTION

The foregoing needs, and other needs that will become apparent for the following description, are achieved in the present invention, which comprises, in one aspect, a method for modifying a subscription of a subscriber to a telecommunications service based on subscriber information and service information that are stored in a directory repository. A directory-enabled service selection framework is coupled to the directory repository for receiving stored information therefrom. The directory-enabled service selection framework receives a request to identify one or more services to which a subscriber is subscribed, based on a prior request to modify the subscription of the subscriber to the telecommunications service. A list is generated of the one or more services to which the subscriber is currently subscribed, based on group membership of the subscriber, one or more roles occupied by the subscriber, and authorization information associated with the subscriber that is stored in the directory repository.

Individual service information is generated for each of the one or more services in the list, based on subscriber information and service information that is stored in the directory repository, for use in automatically subscribing the subscriber to a service that is represented by the individual service information. Accordingly, using user information and service information in a directory, a user is automatically subscribed to network services and logged into services.

In one specific embodiment, a method of modifying a subscription of a subscriber to a telecommunications service based on subscriber information and service information that are stored in a directory repository involves receiving a modification request to modify the subscription of the subscriber to the telecommunications service; determining, based on privilege information in a privilege token associated with the subscriber that is generated by an authorization service, whether the subscriber has privileges sufficient to carry out the requested modification; receiving, from the directory repository, first subscriber information and first service information representing only such services for which the subscriber is then currently subscribed; modifying the first subscriber information and first service information to reflect the modification; sending the modified information to the directory repository, resulting in creating and storing, in the directory repository, second service information that reflects the modification; and generating an engagement request to engage the telecommunications service for the subscriber in order to fulfill the modification request.

Creating and storing the privilege token may involve receiving a user name associated with the subscriber and mapping the user name to a distinguished name in the directory repository; creating and storing in the privilege token one or more roles occupied by the subscriber based on role information that is stored in the directory repository.

A host object in the directory may uniquely identify the subscriber and the host object may contain the privilege token corresponding to the subscriber.

Subscribing the subscriber to the service may involve creating and storing a relation of a subscriber object that programmatically represents the subscriber to a service object that programmatically represents the service, and creating and storing one or more attribute values in the relation, wherein the attribute values define the subscription.

A data model is described that is scalable and easy to manage. In one embodiment, the data model is implemented in the context of a directory service that conforms to Lightweight Directory Access Protocol (LDAP); however, the data model may be used with any data store. A service selection gateway interface provides an interface between a directory enabled service selection system and a service selection gateway. Service management and selection is separated from user authentication processing. As a result, any of a plurality of authentication methods may be used in the system without altering the user or service management.

In other aspects, the invention encompasses a computer apparatus and a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram of an example of a directory-enabled service selection system and related elements of a service subscription system.

FIG. 2A is a flow diagram of a login process for a bridged user.

DETAILED DESCRIPTION

Figure 2B:
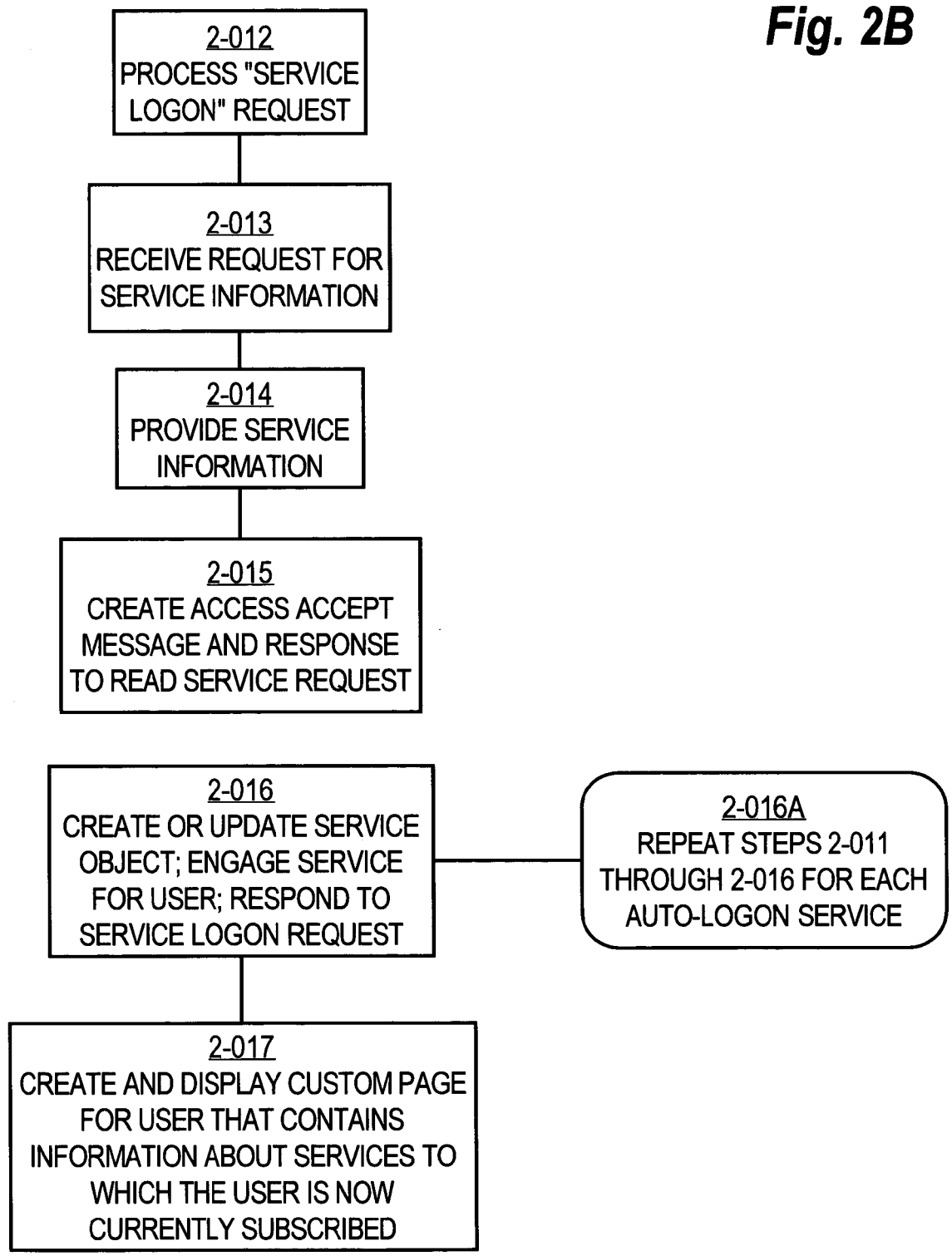
FIG. 2B is a flow diagram of further steps in the process of FIG. 2A.

A method and apparatus for communicating network quality of service policy information to a plurality of policy enforcement points is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

CONTEXT AND BACKGROUND

A directory-enabled service selection system is described that provides a set of common interfaces and services to facilitate service selection and management.

Ease of administration is achieved using a data model that allows management of users at the group level. Users with common service and management requirements may be managed as a group, rather than individually, as the latter adds significant overhead. For example, in large ISP environments, the ratio of administrators to users is significantly lower than that within typical enterprise intranet/extranet environments. Support for bulk management of users, services and other objects achieves efficiency. In one embodiment, users within a group are automatically subscribed to a default set of services. Exceptions may be managed on a user-by-user basis.

User self-service is achieved wherein the user can manage certain aspects of the environment to suit the user's preferences. Self-service functions include, for example, subscribing to services, unsubscribing from services, and modifying user data. In one embodiment, a user may modify only those attributes for which the user has been granted rights to modify, as established by an administrator. Users also may create sub-accounts and place additional restrictions on such accounts. Privileges granted to such sub-accounts are subsets of the privileges granted to the parent account. For example, a parent may create sub-accounts for other members of a household and restrict the services that the sub-accounts can access.

Delegation of authority is achieved through administration functions. A top-level administrator may delegate the administrative responsibilities to multiple different administrators. For example, an administrator may be granted privileges to manage the objects and resources located within a particular physical domain or site. Such delegation results in a highly scalable administrative method.

Authentication is considered separate from user and account management. Improved authorization processing is achieved using role-based access control. In one embodiment, in role-based access control, users do not have discretionary access to protected objects. Instead, access permissions are associated with Roles, and users are made members of Roles. Users can be assigned to multiple roles and may be moved from one role to another without modifying the underlying security policies. Role-based access control allows the definition of security policies that closely match the enterprise operations. Users are assigned to roles that have the privileges to perform certain high-level, application-specific operations.

In one embodiment, the following Roles and privileges are defined.

SUBSCRIBER—In the Subscriber role, users may subscribe to services.

PUBLISHER—Users in the Publisher role may create service objects, and may also assign access policies to the services that they create.

ADMINISTRATOR—Users who are Administrators may create any object; may assign users to roles; may assign access policies to service; and may delegate administrative authority to other users.

Role affinity, as described further herein, determines the scope of the foregoing privileges. Privileges generally may include the ability to modify an attribute; to delete an attribute; to add an attribute; to create an object that is subordinate to a specified parent object; to remove a specified object; to rename a specified object; to Subscribe to a specified service; to Unsubscribe from a specified service; and to manage a specified object.

In one embodiment, a data model is based on an LDAP directory. Directories generally are partitioned and replicated. Users and services are placed in containers that are organized by locality. For example, users located within San Jose are created within a top-level container representing San Jose. As a result, partitioning and replication policy across physical reasons is facilitated.

Personalization allows the creation of a custom user interface and other preferences based on a user's subscription level. For example, users within a subscription level may be automatically subscribed to a set of services. In addition, the administrator may create different user interface templates based on user subscription level and group memberships. The user may customize these templates.

Configuration changes, such as the addition of a new service, changes to a user's subscription status, etc., are processed using events.

Structural Overview

FIG. 1 is a block diagram of an example of a directory-enabled service selection system and related elements of a service subscription system. In the following discussion, a high-level description of a directory-enabled service selection system is provided, and pertinent components are described from within the context of a directory-enabled service selection system. Also, the entire description below is given with respect to one example embodiment; other embodiments with different details are possible and are contemplated.

Client 102 is communicatively coupled to service selection gateway 104 by link 104A. Client 102 is a browser process such as Microsoft Internet Explorer, Netscape Communicator, etc., executed by an end station device such as a personal computer, workstation, personal digital assistant, etc. Link 104A is an HTTP link. Service selection gateway 104 is a combination of software and hardware elements that cooperate to provide telecommunications service selection and provisioning services.

Service selection gateway 104 is communicatively coupled by link 104B to authentication server 106. In one embodiment, link 104B uses the RADIUS protocol and authentication server 106 is a RADIUS server, e.g., an IBM AAA server. Service selection gateway 104 also is communicatively coupled by link 104C to service selection dashboard 110, which provides user interface and other support functions for the service selection gateway. In one embodiment, link 104C uses the RADIUS protocol. Alternatively, interaction between the service selection gateway 104 and service selection dashboard 110 may use XML over HTTP. An example of a commercial product that can serve as service selection gateway 104 is the Cisco 6400 Access Concentrator of Cisco Systems, Inc.

Service selection dashboard 110 is communicatively coupled by link 110A to directory enabled service selection system 112, which comprises one or more software or hardware elements that are configured to carry out the functions described further herein. In one embodiment, directory enabled service selection system 112 is accessed through a plurality of software function calls that together comprise an application programming interface (API) useful to other programs. In this embodiment, communications over link 110A use the directory enabled service selection API.

Service selection dashboard 110 also is communicatively coupled by link 110B to authorization service 114. Authorization service 114 provides security and client authorization functions. For example, authorization service 114 determines which privileges are associated with a user, as further described herein. The authorization service 114 may be implemented in the form of a set of Java® classes that execute in the same Java Virtual Machine as the service selection dashboard and directory enabled service selection system. Link 110B carries function calls and reply messages that conform to an authorization management API.

Directory enabled service selection system 112 is communicatively coupled by link 112A to authorization service 114, and by link 112B to directory server 118. Link 112A may use function calls defined by the Role-Based Access Control (RBAC) protocol now under consideration by the IETF. Authorization service 114 is also coupled to directory server 118 by link 114A.

Directory server 118 is a repository for user, service, authorization and other data. In one embodiment, directory server 118 conforms to Lightweight Directory Access Protocol (LDAP) and may be, for example, Microsoft Active Directory, Novell Netware Directory Service, etc. In this case, links 112B, 114A use LDAP protocol function calls.

Optionally, a user database 108 is coupled to authentication server 106 and to directory synchronizer 120 by link 120A. Directory synchronizer 120, when present, is communicatively coupled to directory server 118 by link 118A. Link 120A uses a protocol as defined by the requirements of user database 108, and link 118A uses LDAP when directory server 118 is an LDAP directory. In this configuration, directory server 118 may be synchronized to user database 108 by using directory synchronizer 120, thereby making directory information available to other applications.

The authentication server 106 is used primarily for user authentication. When authentication server 106 is a RADIUS server, selected RADIUS attributes may be defined in the AAA database and may be used by the service selection gateway. Service and user data is in directory server 118. In an embodiment, a schema is defined for storing the user and service data in an LDAP directory. An example schema is set forth herein in APPENDIX 1.

The user and service data is read from the directory using the APIs as defined herein. Interaction between the service selection gateway and service selection dashboard uses RADIUS, but this is not required. The user and service data is read by calling appropriate APIs from the directory enabled service selection system. In one embodiment, the directory enabled service selection system comprises one or more Java® computer programs. In one implementation, Java® classes that implement the service selection dashboard and the directory enabled service system are loaded in the same Java Virtual Machine, and the directory enabled service selection system implicitly trusts the service selection dashboard. Alternatively, different JVMs are used, and the service selection dashboard establishes an identity with the directory enabled service selection system using the authorization service before privilege tokens are requested for a user.

In one embodiment, service selection gateway reads the user and service data from the directory by making requests to the service selection dashboard. These requests are wrapped in a RADIUS ACCESS REQUEST packet.

The authentication server in service selection dashboard translates service selection gateway requests (wrapped in a RADIUS packet) and calls appropriate directory enabled service selection system routines. This authentication server does not need to perform authentication and accounting functions typically performed by fully functional authentication servers.

After the directory enabled service selection system processing has completed, this authentication server constructs an appropriate RADIUS response message containing the data returned from the directory enabled service selection system routines. The data returned from directory enabled service selection system needs to be translated to a format expected by service selection dashboard. Finally, this RADIUS response message is sent to the service selection gateway.

In one embodiment, the service selection gateway ("SSG") and service selection dashboard ("SSD") interact using RADIUS protocol commands. A set of commands is defined for the interaction between the SSG and SSD. In one specific embodiment, the commands include ACCOUNT LOG ON, ACCOUNT LOG OFF, SERVICE LOG ON, SERVICE LOG OFF, DEFAULT DNS SERVICE, SERVICE MESSAGE, ACCOUNT STATUS QUERY, SERVICE ACCESS ORDER, a command to set a Privilege token in the service selection gateway by associating it with a Host object, and a command to retrieve a Privilege token that is stored in a specified Host object.

In an alternative embodiment, privilege tokens are stored in an aggregation device, so that the privilege tokens can be associated with IP addresses of subscribers. Examples of aggregation devices that can be used in this alternative are the Cisco 6400 Access Concentrator, Cisco AS5800 Universal Access Server, Cisco AS5300 Voice Gateway, Cisco 7200 Series Routers, and similar devices.

When user information changes, the service selection dashboard sends an event to the service selection gateway. The connection associated with the user is included in the event message. For example, if a user subscribes to a new service, the service selection dashboard will send an event to the service selection gateway. This event is wrapped in a RADIUS ACCESS REQUEST message. The service selection gateway should then query the service selection dashboard for the user data and update the user host object appropriately. Both the service selection gateway and the service selection dashboard implement a RADIUS server and a RADIUS client.

In this configuration, the RADIUS protocol is used primarily as an RPC mechanism between the service selection gateway and service selection dashboard. Alternatively, interaction between the service selection gateway 104 and service selection dashboard 110 may use XML, which can provide richer interaction semantics than RADIUS.

Service selection dashboard 110 may include a DESS to RADIUS translator that provides protocol translation between RADIUS and the APIs of the directory-enabled service selection system 112.

Functional Overview

A. System Interaction—Bridged User

FIG. 2A is a flow diagram of a login process for a bridged user of a client machine that can establish an Internet Protocol (IP) connection to service selection dashboard 110.

In block 2-001, the current logon status of the client is determined, and user name and password information is received. In one embodiment, an IP-enabled client accesses the service selection dashboard, for example, by connecting to the service selection dashboard using a Uniform Resource Locator (URL) that is associated with the service selection dashboard. The client can connect to the service selection dashboard only by sending a request through the service selection gateway. Accordingly, the service selection gateway can identify the request and determine whether the client is currently logged in, by testing whether the service selection gateway has a host object in memory for the client. If the client is not presently logged in, i.e., there is no host object in the service selection gateway for the client, then the service selection dashboard displays a login form to the client. The client provides a user name and password and returns them to the service selection dashboard in an HTML document, e.g., using a POST request that submits the contents of an online form.

In block 2-002, an access request is sent to the service selection gateway. In one embodiment, the service selection dashboard extracts the user name and password from the HTML document. The service selection dashboard constructs a RADIUS REQUEST packet and sends it to the service selection gateway.

In block 2-003, an access request is sent to the authentication server. In one embodiment, the service selection gateway receives the RADIUS REQUEST packet from the service selection dashboard, and forwards the packet on to the authentication server. In block 2-004, authentication of the user information is carried out, and a response is provided.

As indicated by block 2-005, if authentication of the user name and password at the authentication server is successful, then a Host Object for the client is created and stored. The authentication server responds with a Success message, and the service selection gateway responds to the service selection dashboard with a success indication. If the login fails, then the service selection gateway sends a failure notification message to the service selection dashboard. No Host Object is created by the service selection gateway in that case. The service selection dashboard provides an appropriate error message to the client and processing stops.

For example, the service selection gateway notifies the service selection dashboard with an ACCESS ACCEPT message (indicating a successful login) or an ACCESS REJECT message (indicating that the login failed). If the login failed, then the service selection dashboard will send another login form to the client with a suitable error message indicating that the login has failed. If the login succeeds, then the service selection dashboard proceeds to the next step.

In block 2-006, the service selection dashboard requests the authorization service to provide a privilege token for the user that just logged in.

To create a privilege token in response, the authorization service maps the user name to a name in the directory. In an embodiment, the user name as specified in a database of the authentication server is mapped to an LDAP distinguished name (DN) in the directory server 118. The mapping may be application-specific. The directory enabled service selection system then builds a privilege set for the user. In one embodiment, a privilege set comprises:

1. User Name—the DN of the user.
2. Roles Occupied—the Roles that the user occupies, which determines the privileges that the user has to perform various operations in the system.
3. Authentication Quality—the quality of authentication used to establish the identity.
4. Current Time—a value specifying the login time or the time at which the token is generated.
5. Expiration Time—a value indicating when the token expires. Once a token expires, the client is prompted to log in again. A value of "0" means that the token does not expire.

In one embodiment, each privilege token identifies a role of the subscriber, and the role maps to one or more privileges of the subscriber. The privileges of the subscriber specify what telecommunications services to which the subscriber is entitled to subscribe. A mapping of roles to privileges may be stored in the directory, a programmatic table, or a database.

In block 2-007, the authorization service returns the privilege token to the service selection dashboard. In one embodiment, the privilege token is provided in clear text and stored at the service selection gateway. Alternatively, the privilege token may be encrypted to prevent security attacks such as replay, forgery, etc.

In block 2-008, the service selection dashboard sends the privilege token to the service selection gateway and requests it to be stored with the Host object that identifies the current user. In response, the service selection gateway stores the privilege token with the corresponding Host object. In this configuration, the service selection dashboard is not required to maintain state information or perform cleanup operations for each user. In an alternative embodiment, privilege tokens are sent to and stored in an aggregation device, so that the privilege tokens can be associated with IP addresses of subscribers. Examples of aggregation devices that can be used in this alternative are the Cisco 6400 Access Concentrator, Cisco AS5800 Universal Access Server, Cisco AS5300 Voice Gateway, Cisco 7200 Series Routers, and similar devices.

In a separate interaction with the service selection dashboard, the service selection gateway receives more information regarding the services to which the user has subscribed, as well as information regarding each of the services. Specifically, in block 2-009, a request for a current list of services to which a user subscribes is received. In an embodiment, the service selection dashboard requests the directory-enabled service selection system for the current list of services to which the user is subscribed. For each of the services, the service selection dashboard also may request service profile information, or information about the user, if needed. Implementation of block 2-009 may involve extracting a role value from the privilege token, looking up the role value in a mapping of roles to privileges, and obtaining from that mapping a list of privileges that are associated with the role. Based on the privileges, available services are determined.

In block 2-010, user and service information is provided. In an embodiment, the directory-enabled service selection system responds with the service and user information. The directory-enabled service selection system uses group membership, role occupancy, and authorization information to generate the list.

In block 2-011, "auto-logon" services are processed. In an embodiment, the service selection dashboard creates and stores a list of services that are marked as "Auto Logon." This information is available in the response that is sent from the directory-enabled service selection system to the service selection dashboard in the preceding step.

FIG. 2B is a flow diagram of further steps in the process of FIG. 2A. Referring now to FIG. 2B, for each "Auto Logon" service, the service selection dashboard sends a "Service Logon" request to the service selection gateway. In block 2-012, a "Service Logon" request is processed. In an embodiment, the service selection gateway receives a "Service Logon" request from the service selection dashboard. The service selection gateway creates an ACCESS REQUEST packet that contains the service name, and sends it to the service selection dashboard. This request is used to read the service profile information. Specifically, the service information is read from the LDAP directory and not from the authentication server that performs authentication.

In block 2-013, the request for service information is received. In an embodiment, the authentication server marshals a Service Read request that is received in the ACCESS REQUEST message, and calls one or more directory-enabled service selection system functions using the directory-enabled service selection system API to read the Service information.

In block 2-014, service information is provided. In an embodiment, the directory-enabled service selection system responds with the service information.

In block 2-015, an ACCESS ACCEPT message is created, and a response is provided to the Read Service request that was received in block 2-013.

In block 2-016, a service object is created or updated, the requested service is engaged for the user, and a response to the Service Logon request is issued. In one embodiment, the service selection gateway creates or updates the Service object. It then engages the service for the user. Engaging a service may involve creating and storing a relation of a subscriber object that programmatically represents the subscriber to a service object that programmatically represents the service, and creating and storing one or more attribute values in the relation, wherein the attribute values define the subscription. The service selection gateway then responds to the original Service Logon request that it received from the service selection dashboard.

As indicated by block 2-016A, steps 2-011 through 2-016 are repeated for each Auto-Logon service.

In block 2-017, a custom page is created and displayed for the user, and the page contains information about services to which the user is then currently subscribed. In an embodiment, the page is created and displayed by the service selection dashboard.

Figure 2C:
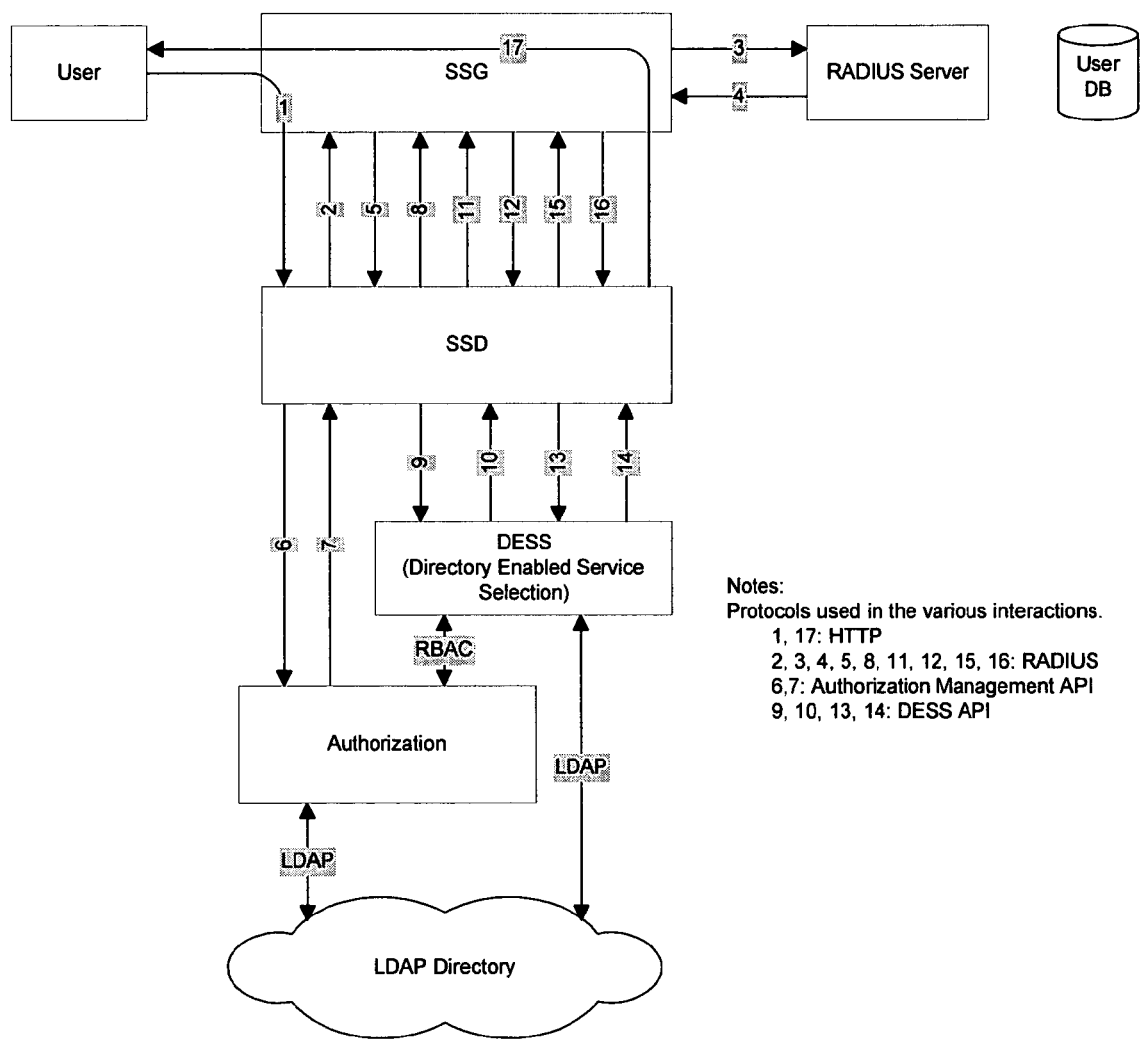
FIG. 2C is a block diagram showing interaction of elements of the system of FIG. 1 when carrying out the process of FIG. 2A, FIG. 2B.

FIG. 2C is a block diagram showing interaction of elements of the system of FIG. 1 when carrying out the process of FIG. 2A, FIG. 2B. In FIG. 2C, numbered paths correspond to similarly numbered steps of FIG. 2A, FIG. 2B. For example, path 8 in FIG. 2C corresponds to step 2-008 of FIG. 2A.

In this arrangement, subscription of a subscriber to a service involves creating and storing a relation of a subscriber object that programmatically represents the subscriber to a service object that programmatically represents the service, and creating and storing one or more attribute values in the relation, wherein the attribute values define the subscription.

B. System Interaction—PPP User

When the user is connecting using PPP, a similar login process is carried out, using the following steps, which do not involve participation by the service selection dashboard.

1. Client submits user name and password to the service selection gateway over a PPP connection.

2. The service selection gateway constructs a RADIUS ACCESS REQUEST message and sends it to the authentication server.

3. The authentication server performs the authentication and returns either an ACCESS ACCEPT (if authentication succeeds) or an ACCESS REJECT (if the authentication fails). If the authentication fails then the service selection gateway sends an appropriate error message to the client and the processing stops.

4. If the client has successfully logged in the service selection gateway constructs a Host object and responds to the client. In the next step the client will connect to the service selection dashboard using a browser.

5. The client accesses the service selection dashboard URL. The service selection dashboard queries the service selection gateway for the login status of the client. This request is made using the RADIUS protocol. The service selection gateway responds with a status that indicates that the user has performed a successful login. The user name is returned as a part of this interaction.

6. The service selection dashboard uses the user information from the previous message and calls the appropriate API function to construct the user privilege token.

7. The Authorization system returns the privilege token to the service selection dashboard. Currently the Privilege token is returned in clear text. This token will not be transmitted on the wire to the client workstation, but only stored in the service selection gateway. In future versions this Privilege token will be encrypted to prevent security attacks such as replay, forgery, etc.

8. The service selection dashboard sends this privilege token to the service selection gateway and requests that it be stored with the appropriate Host object that identifies the current user. The service selection gateway stores the privilege token with the Host Object. It is more convenient to store the Privilege token with the Host Object in the service selection gateway rather than storing it in the service selection dashboard. The service selection dashboard does not need to maintain state and perform cleanup operations on a user level. These operations are currently performed by the service selection gateway.

9. The service selection dashboard requests the directory-enabled service selection system for the current list of services the user has subscribed to. For each of the services the service selection dashboard may also request the service profile information. The service selection dashboard may also request information about the user at this stage, if needed.

10. The directory-enabled service selection system responds with the user and service information. Directory-enabled service selection system uses group membership, role occupancy and authorization information to generate this list.

11. The service selection dashboard builds a list of services that are marked as "Auto Logon". This information is available in the response sent from the directory-enabled service selection system to the service selection dashboard in step 10. For each "Auto Logon" service the service selection dashboard sends a "Service Logon" request to the service selection gateway.

12. The service selection gateway receives a "Service Logon" request/command from the service selection dashboard. It builds a RADIUS ACCESS REQUEST packet containing the service name and sends it to the service selection dashboard. This request is used to read the service profile information. The service information is read from the LDAP directory and not from the authentication server used to perform the authentication.

13. The authentication server in service selection dashboard marshals the Service Read request (wrapped in a RADIUS ACCESS REQUEST message) and calls the directory-enabled service selection system APIs to read the Service information.

14. The directory-enabled service selection system responds back with the service information.

15. The service selection dashboard creates a suitable RADIUS ACCESS ACCEPT message and responds to the original service selection gateway "Read Service" request issued in step 12 above.

16. The service selection gateway creates (or updates) the Service object. It then engages the service for the user. The service selection gateway will then respond to the original Service Logon request it received from the service selection dashboard. The service selection dashboard repeats steps 11 through 16 for each service that is marked as Auto Logon.

17. The service selection dashboard builds a custom page for the current user.

This page contains information regarding the services the user has currently subscribed to.

The service selection dashboard presents new web page to the user with the service information. The custom page includes the set of services the user has subscribed to (either explicitly or via group membership). If the user no longer has the appropriate privileges to any of the services that specific service is not included in the page. Privileges may be revoked between the time the user may have subscribed to the service and the time that this custom page is generated. The directory-enabled service selection system may also modify the directory data store to reflect this modified set of subscribed service list.

Figure 3:
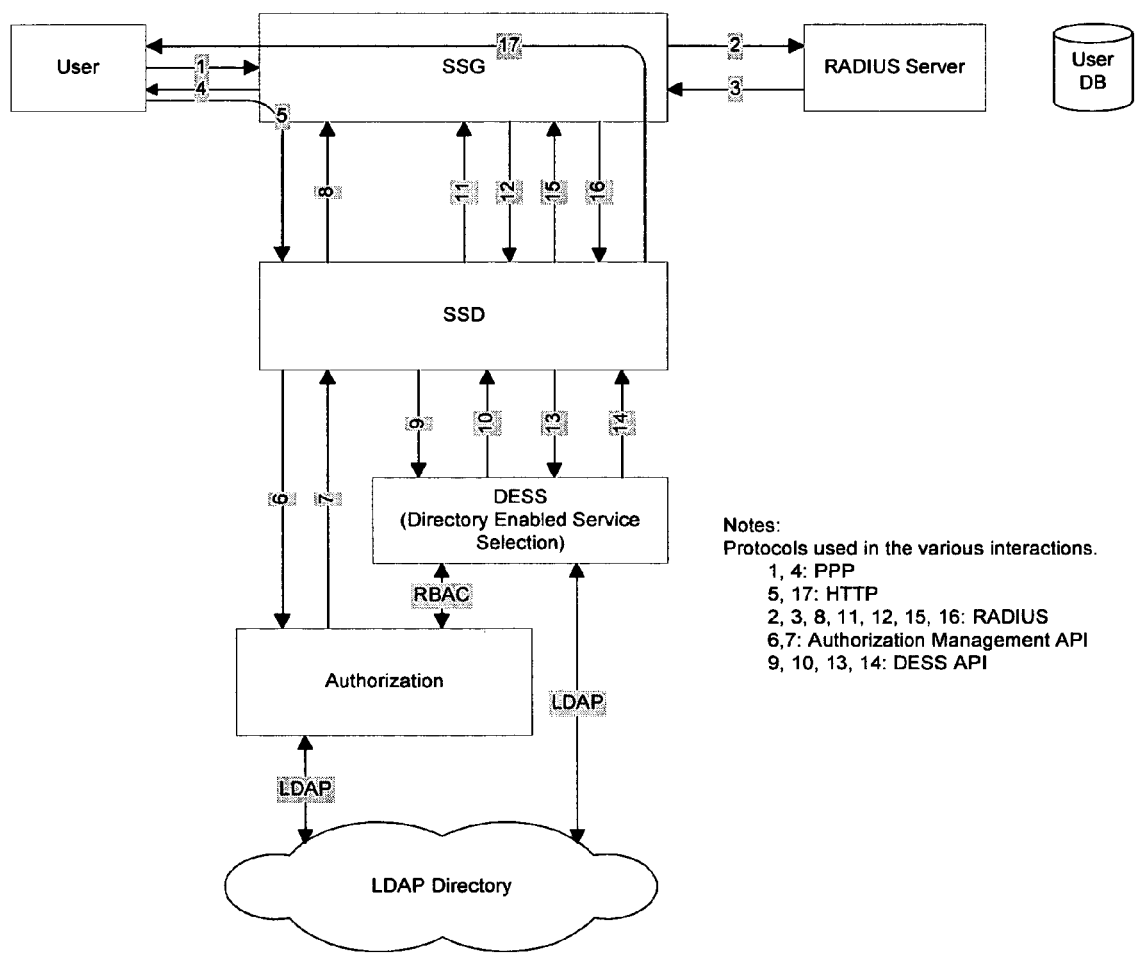
FIG. 3 is a block diagram showing interaction of the elements of FIG. 1 when carrying out a login process for a PPP user.

FIG. 3 is a block diagram showing interaction of the elements of FIG. 1 when carrying out the process set forth in steps 1 through 17 above.

C. System Interaction—Service Logon

Figure 4A:
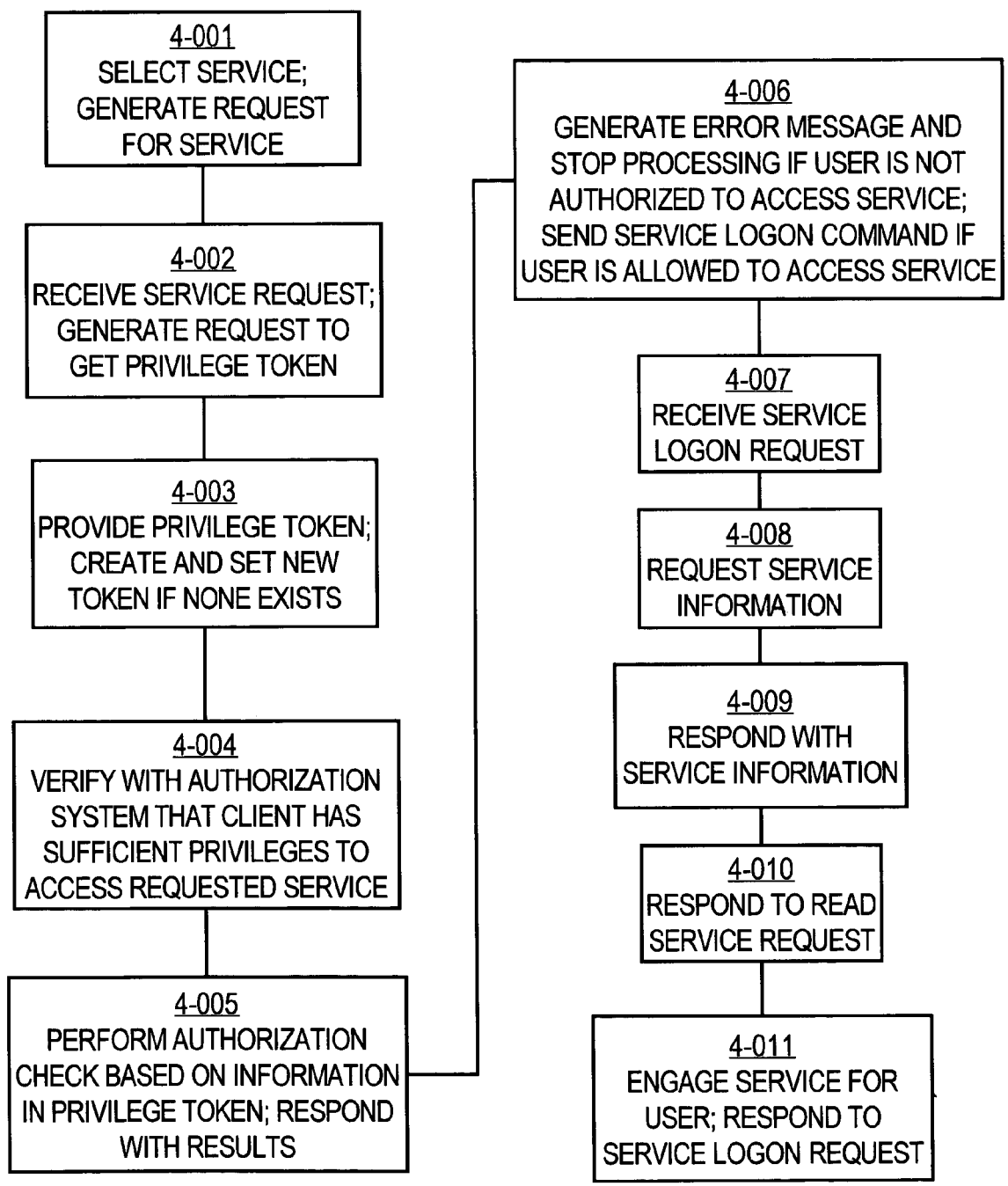
FIG. 4A is a flow diagram showing a process of carrying out a service logon.

FIG. 4A is a flow diagram showing a process of carrying out a service logon.

In block 4-001, a service is selected and a request for a service is generated. In an embodiment, a user selects the service to connect to by clicking on the appropriate link on a Web page. This generates a request to the service selection dashboard.

In block 4-002, the service request is received, and a request to get a privilege token is generated. In an embodiment, the service selection dashboard receives the Service Logon/connect request from the client. The service selection dashboard makes a request to get the Privilege token associated with the current client from the service selection gateway.

In block 4-003, the privilege token is provided, and a new token is created and set if none exists. In an embodiment, the service selection gateway responds with the privilege token. If no privilege token exists, the service selection dashboard builds a new token and sets it in the service selection gateway.

In block 4-004, verification with the Authorization system is carried out to determine that the requesting client has sufficient privileges to access the requested service. In an embodiment, the service selection dashboard calls the authorization system to verify that the client has sufficient privileges to access the requested service. Calling a function of the API in the Authorization system performs this check.

In block 4-005, an authorization check is performed based on information in the privilege token, and a response with the results is generated. In an embodiment, the Authorization system performs the authorization check based on the information in the user privilege token. The privilege token contains the user name, roles the user occupies, etc. The Authorization system responds with the results of the privilege check.

As indicated by block 4-006, if the user is not authorized to access the service, then an error message is generated and processing is stopped. Alternatively, if the user is allowed to access the service, a service logon command is sent. In an embodiment, if the user is not authorized to access the service the service selection dashboard will send a suitable error message to the client. Processing stops at this stage. If the user is allowed to access the service, the service selection dashboard sends a Service Logon command to the service selection gateway.

In block 4-007, a service logon request is received. In an embodiment, the service selection gateway receives a "Service Logon" request/command from the service selection dashboard. It builds a RADIUS ACCESS REQUEST packet containing the service name and sends it to the service selection dashboard. This request is used to read the service profile information. The service information is read from the LDAP directory and not from the RADIUS server used to perform the authentication In block 4-008, service information is requested. In an embodiment, the RADIUS server in service selection dashboard marshals a Service Read request (wrapped in a RADIUS ACCESS REQUEST message) and calls the directory-enabled service selection system APIs to read the Service information.

In block 4-009, a response with the service information occurs. In an embodiment, the directory-enabled service selection system responds back with the service information.

In block 4-010, a response to the read service request is issued. In one embodiment, the service selection dashboard creates a suitable RADIUS ACCESS ACCEPT message and responds to the original service selection gateway Service Read request issued in block 4-007 above.

In block 4-011, the selected service is engaged for the user. In an embodiment, the service selection gateway creates (or updates) the Service object. It then engages the service for the user. The service selection gateway will then respond to the original Service Logon request it received from the service selection dashboard. Additionally, the service selection dashboard may respond by creating or updating the user Web page and responding back to the client. Service engagement may involve creating and storing a relation of a subscriber object that programmatically represents the subscriber to a service object that programmatically represents the service, and creating and storing one or more attribute values in the relation, wherein the attribute values define the subscription.

Figure 4B:
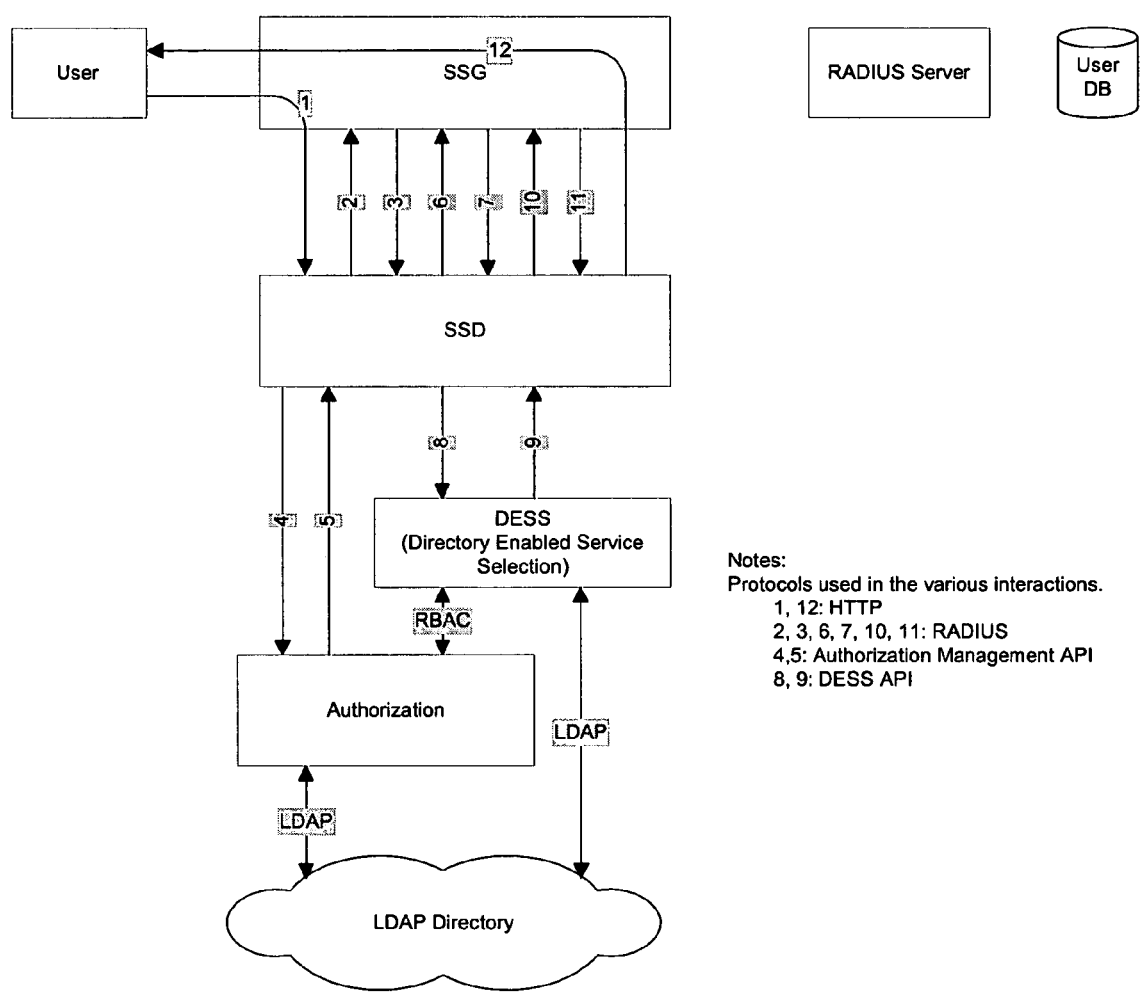
FIG. 4B is a block diagram showing interaction of elements of the system of FIG. 1 when carrying out the process of FIG. 4A.

FIG. 4B is a block diagram showing interaction of elements of the system of FIG. 1 when carrying out the process of FIG. 4A. In FIG. 4B, numbered paths correspond to similarly numbered steps of FIG. 4A. For example, path 8 in FIG. 4B corresponds to step 4-008 of FIG. 4A.

D. System Interaction-Subscribe to Service

Figure 5A:
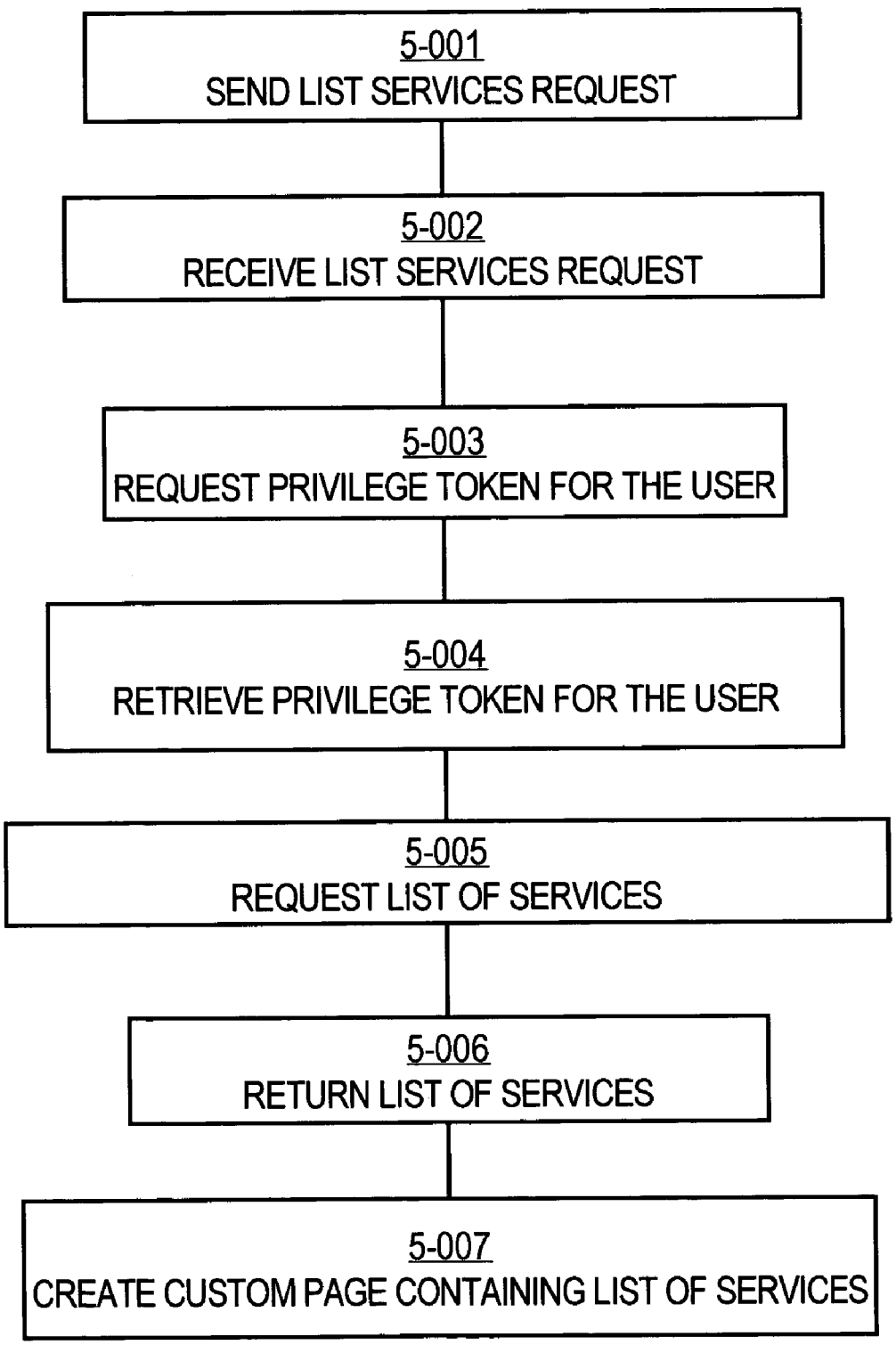
FIG. 5A is a flow diagram illustrating processing a service subscription.
Figure 5B:
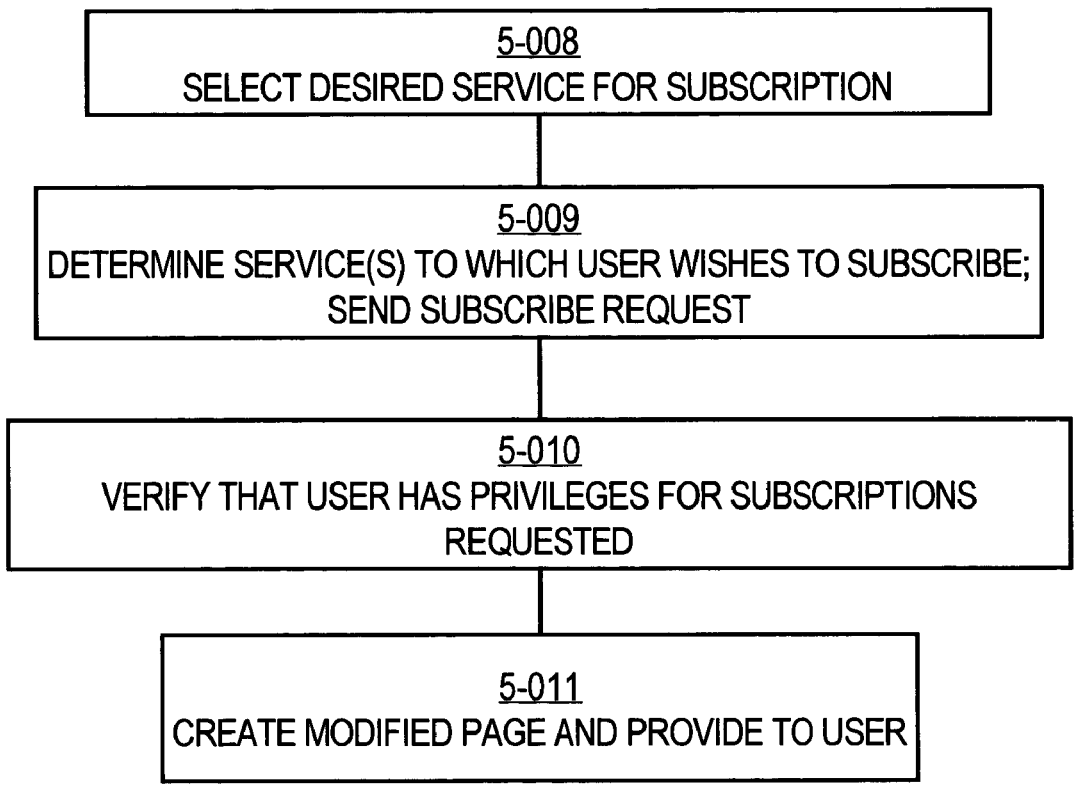
FIG. 5B is a flow diagram illustrating processing a service subscription.

FIG. 5A and FIG. 5B are flow diagrams illustrating processing a service subscription. It is assumed that the user has successfully logged in and the appropriate privilege token has been saved in the Host object in the service selection gateway. In an embodiment, the subscription process consists of two separate phases. In the first phase, shown in FIG. 5A, the user retrieves a set of services that the user is authorized to subscribe to. In the second phase, of FIG. 5B, the user selects the services that the user wishes to subscribe to and sends the request to the service selection dashboard.

In block 5-001, a request to obtain a list of services is sent. In an embodiment, the user sends a List Services request to the service selection dashboard. In block 5-002, the request to list services is received. In an embodiment, the service selection dashboard receives the List Services request that was sent in block 5-001.

In block 5-003, a privilege token for the user is requested. In one embodiment, the service selection dashboard issues a request to the service selection gateway to retrieve the Privilege token for the user who issued the List Services request. In block 5-004, a privilege token for the user is retrieved. In an embodiment, the service selection gateway receives the request to retrieve the privilege token, retrieves the privilege token from the appropriate Host object and returns it to the service selection dashboard.

In block 5-005, a list of services is requested. In an embodiment, the service selection dashboard calls a function of the API in the directory-enabled service selection system to obtain the list. In block 5-006, a list of the services is returned. In one specific embodiment, the directory-enabled service selection system returns the list of services to the service selection dashboard. The list includes only those services and Service groups that the user has the privilege to subscribe to.

In block 5-007, a custom page containing the list of services the user may subscribe to is created and sent to the client. The service selection dashboard may carry out this step.

Referring now to FIG. 5B, in a separate phase that begins at block 5-008, the user selects one or more services to which the user wishes to subscribe. In one embodiment, the user also sends a request to subscribe to such services to the service selection dashboard.

In block 5-009, the services to which the user wishes to subscribe are determined. In one embodiment, the service selection dashboard extracts, from the request of the user, the list of services or service groups to which the user wants to subscribe. The service selection dashboard then calls a function of the API in the directory-enabled service selection system to obtain the list. The API includes a Subscribe Service function call that carries out service subscription. The function may involve creating and storing a relation of a subscriber object that programmatically represents the subscriber to a service object that programmatically represents the service, and creating and storing one or more attribute values in the relation, wherein the attribute values define the subscription.

In block 5-010, verification is made that the user has privileges for subscriptions that are requested. In one embodiment, the directory-enabled service selection system verifies that the user has the appropriate privileges to subscribe to each of the services in the service list. If the user has appropriate privileges, then the user object is modified in the directory data store. If the user does not have sufficient privileges then an exception is thrown. The directory-enabled service selection system responds to the service selection dashboard.

In block 5-011, a modified page listing subscribed services is created and provided to the user. For example, the service selection dashboard builds a modified web page for the user. The new page reflects the modified list of subscribed services. The new page is sent to the client.

E. System Interaction—Unsubscribe from Service

According to one embodiment, a service unsubscribe process is provided. When the service unsubscribe process begins, it is assumed that the user has successfully logged in and the appropriate privilege token has been saved in the Host object in the service selection gateway.

In one specific embodiment, the user selects the services from which the user wishes to unsubscribe, and sends an Unsubscribe request to the service selection dashboard. The user may select a list of services or service groups to unsubscribe from. This request is sent over HTTP.

The service selection dashboard receives the Unsubscribe request. The service selection dashboard sends a request to the service selection gateway to retrieve the Privilege token for the current user.

The service selection gateway retrieves the privilege token from the appropriate Host object and sends it to the service selection dashboard.

To carry out un-subscription, the service selection dashboard calls an Unsubscribe function call of the API of the directory-enabled service selection system system. The service names and the privilege token are included in this request.

The directory-enabled service selection system verifies that the user has the appropriate privileges to unsubscribe from the specified service or service groups. If the user is not authorized to perform the unsubscribe operation then an exception is thrown. If the user has sufficient privileges the user object is appropriately modified in the directory store.

The service selection dashboard will send a Service Logoff command to the service selection gateway for any of the unsubscribed services the user may be currently connected to.

The service selection dashboard builds a modified page for the user. The new page reflects the modified list of subscribed services. The new page is sent to the client.

F. System Interaction—Service Logoff

According to an embodiment, a service logoff process is provided. It is assumed that the user has successfully logged in and the appropriate privilege token has been saved in the Host object in the service selection gateway.

The user selects the service he/she wishes to logoff from and sends a Service Logoff request to the service selection dashboard. This request is sent over HTTP.

The service selection dashboard receives the Service Logoff request. The service selection dashboard creates a Service Logoff request, which may be wrapped in a RADIUS message, and sends it to the service selection gateway.

The service selection gateway performs the service logoff operation and responds to the service selection dashboard.

The service selection dashboard builds a modified web page reflecting the modified set of currently logged on services. It then sends the modified page to the client.

G. System Interaction—User Logoff

In an embodiment, a user logoff process is provided. It is assumed that the user has successfully logged in and the appropriate privilege token has been saved in the Host object in the service selection gateway.

The user sends a User Logoff request to the service selection dashboard. This request is sent over HTTP.

The service selection dashboard receives the User Logoff request. The service selection dashboard creates a User Logoff request, wrapped in a RADIUS message, and sends it to the service selection gateway.

The service selection gateway performs the user logoff operation and responds to the service selection dashboard.

Software Interface of Directory Enabled Service Selection System

In one specific embodiment, the directory-enabled service selection system comprises a set of Java® classes that include interface classes that provide an API callable by other methods, programs or processes.

Specifically, a "subscriber" interface represents a subscriber. Any entity that can be a subscriber implements this interface. Examples include user, organizational units, groups, etc.

A "user" interface class represents a user. A "group" class represents a group object. A "service" class represents a service. A "tunnelService" class represents a tunnel service. A "passthroughService" class represents a pass through service. A "proxyService" class represents a proxy service.

In one embodiment, a group of subscribers is defined explicitly by creating and storing a named group that contains one or more subscribers as group members. For example, an administrator can create groups by names and assign names of subscribers to the groups. Group objects in the directory store a list of the assigned names. Alternatively, a group of subscribers is defined implicitly such that the group comprises one or more subscribers in an object tree of the directory repository who are subordinate in the tree to a container node of the tree.

Directory Schema

Service and user data is in directory server 118. In an embodiment, a schema is defined for storing the user and service data in an LDAP directory. An example schema is set forth herein in APPENDIX 1.

In the schema, subscribers may be individual users as well as groups. An object, such as a user, container or group in an existing directory, may be made a subscriber by adding the subscriber auxiliary class to it. Services "subscribed" to a group are also available to all users that are members of the group.

Figure 6:
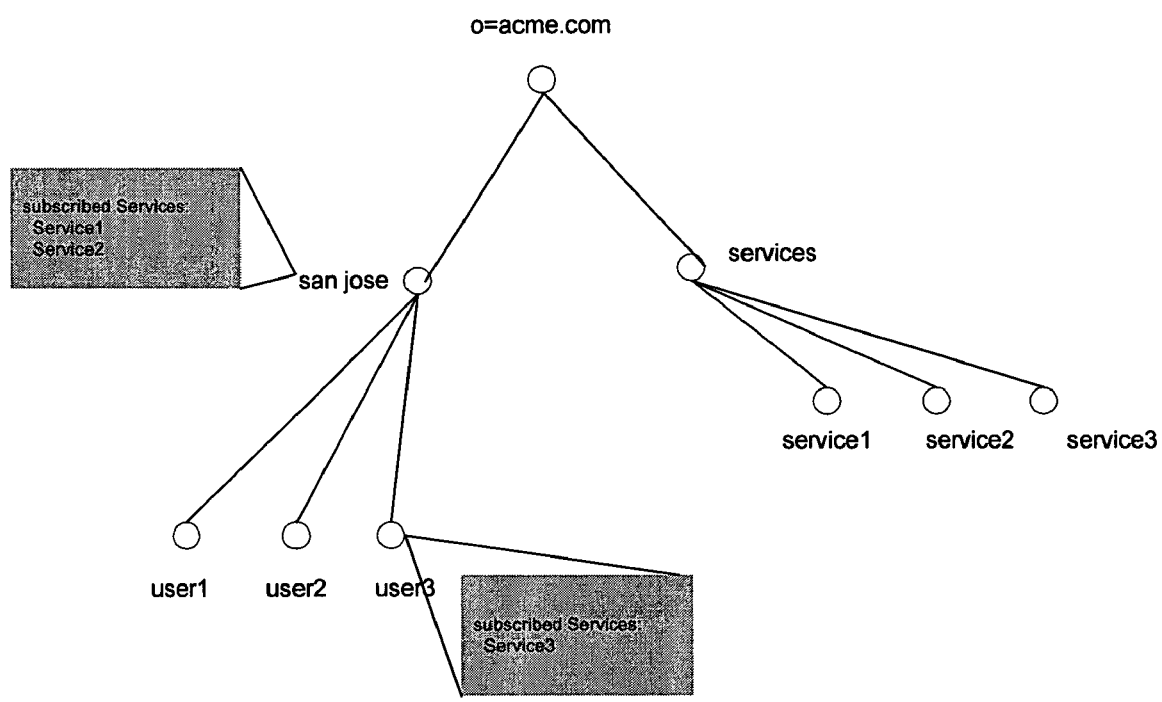
FIG. 6 illustrates a service inheritance mechanism.

FIG. 6 illustrates a service inheritance mechanism. A directory container object (ou=san jose,o=acme.com) is a subscriber for the following services, "cn=service1, ou=services,o=acme.com" and "cn=service2,ou=services, o=acme.com". The users in this container, viz., user1, user2 and user3 are implicit members of this group. Therefore, all these users are implicitly subscribed to the above two services.

User "cn=user3,ou=san jose,o=acme.com" is subscribed to service1, service2 and service3. This user has explicitly subscribed to service service3 and inherits the subscription to the other two services.

Users user1 and user2 are subscribed to services, service1 and service2.

Hardware Overview

Figure 7:
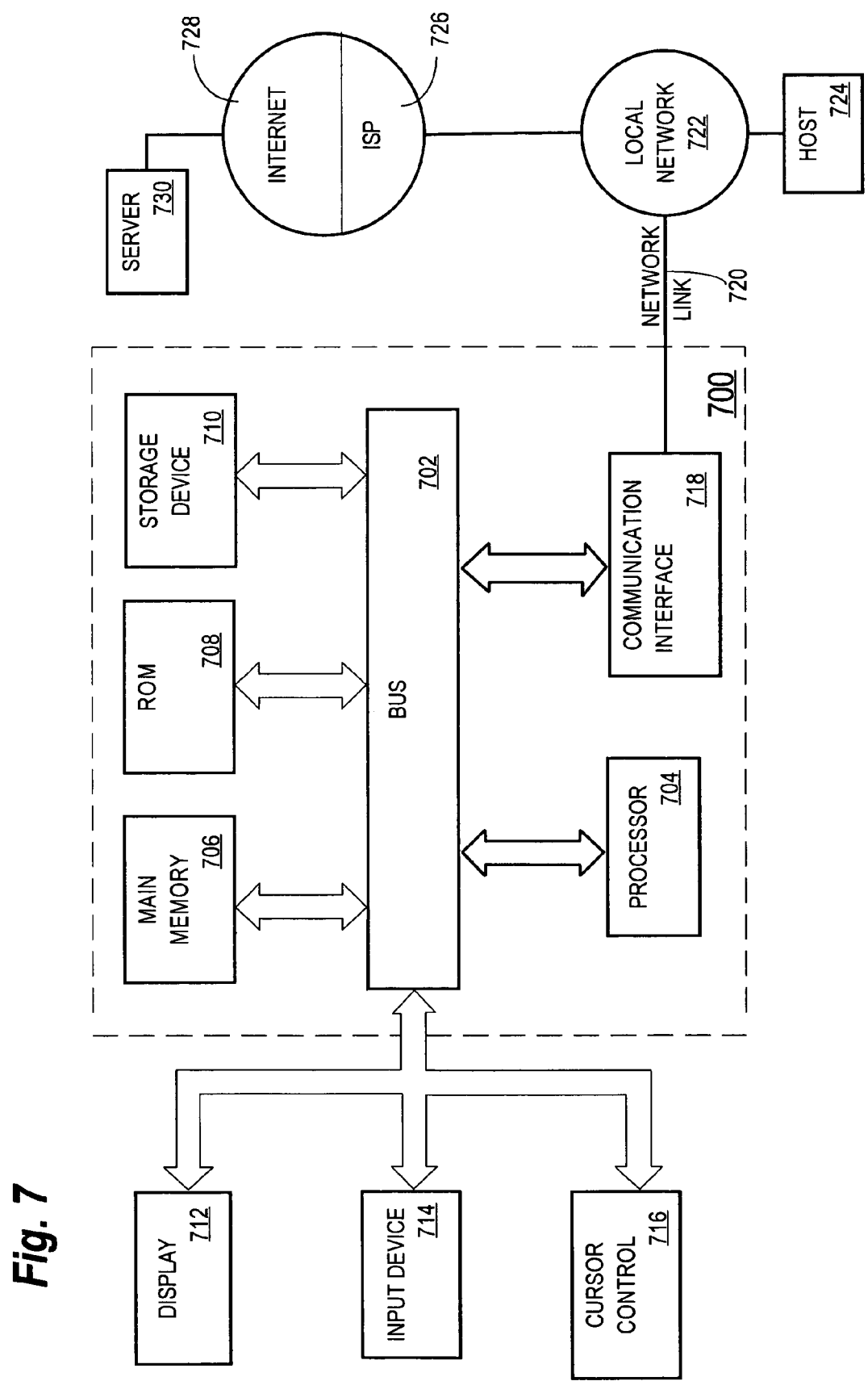
FIG. 7 is a block diagram that illustrates a computer system upon which an embodiment may be implemented.

FIG. 7 is a block diagram that illustrates a computer system 700 upon which an embodiment of the invention may be implemented. The preferred embodiment is implemented using one or more computer programs running on a network element such as a router device. Thus, in this embodiment, the computer system 700 is a router.

Computer system 700 includes a bus 702 or other communication mechanism for communicating information, and a processor 704 coupled with bus 702 for processing information. Computer system 700 also includes a main memory 706, such as a random access memory (RAM), flash memory, or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk, flash memory or optical disk, is provided and coupled to bus 702 for storing information and instructions.

A communication interface 718 may be coupled to bus 702 for communicating information and command selections to processor 704. Interface 718 is a conventional serial interface such as an RS-232 or RS-422 interface. An external terminal 712 or other computer system connects to the computer system 700 and provides commands to it using the interface 714. Firmware or software running in the computer system 700 provides a terminal interface or character-based command interface so that external commands can be given to the computer system.

A switching system 716 is coupled to bus 702 and has an input interface 714 and an output interface 719 to one or more external network elements. The external network elements may include a local network 722 coupled to one or more hosts 724, or a global network such as Internet 728 having one or more servers 730. The switching system 716 switches information traffic arriving on input interface 714 to output interface 719 according to pre-determined protocols and conventions that are well known. For example, switching system 716, in cooperation with processor 704, can determine a destination of a packet of data arriving on input interface 714 and send it to the correct destination using output interface 719. The destinations may include host 724, server 730, other end stations, or other routing and switching devices in local network 722 or Internet 728.

The invention is related to the use of computer system 700 for modifying a subscription of a subscriber to a telecommunication process based on subscriber information and service information that are stored in a directory repository. According to one embodiment of the invention, modifying a subscription of a subscriber to a telecommunication process is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Communication interface 718 also provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for communicating network quality of service policy information to a plurality of policy enforcement points.

Processor 704 may execute the received code as it is received, and/or stored in storage device 710, or other non-volatile storage for later execution. In this manner, computer system 700 may obtain application code in the form of a carrier wave.

CONCLUSION

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

APPENDIX 1—EXAMPLE SCHEMA DEFINITION

1.1. Classes

1.1.1. aclProfileAux

Definition. This auxiliary class defines the inbound and outbound ACL values. IOS ACL parameters can be specified at the group or user level. ACLs can also be specified at the service level. Settings applied at the group level apply to all the users that are members of that group. This applied to both implicit as well as explicit groups. User profile attached at the group level does not need the password attribute. Additionally the aclProfileAux class can specify whether the settings apply to users or services when applied to a container.
Type. Auxiliary
Superior Class. top
OID. tbd
Naming. na
Containment. na
Allowed Attributes

| S. No. | Attribute | Description |
|---|---|---|
| 1. | ciscoAVPair | Specifies additional service configuration parameters. These parameters are specified as a set of "name = value" pairs. This attribute may contain inACL and outACL parameters. |
| 2. | applicableClassACL | The class to which the ACL applies. |

1.1.2. nrpSSG

Definition. Represents an NRP—SSG. Each NRP—SSG reads its configuration from this object.
Type. Structural
Superior Class. top
OID. tbd
Naming. Common Name (cn)
Containment. Organization (O); Organizational Unit (OU)
Allowed Attributes

| S. No. | Attribute | Description |
|---|---|---|
| 1. | nextHopGatewayEntry | Associates next hop gateway keys with ip addresses |

1.1.3. parentAccountAux

Definition. Specifies a parent account. This auxiliary class is attached to accounts that have associated subordinated accounts.
Type. Auxiliary
Superior Class. top
OID. tbd
Naming. na
Containment. na
Allowed Attributes

| S. No. | Attribute | Description |
|---|---|---|
| 1. | subordinateAccounts | List of associated subordinate accounts. |

1.1.4. passthroughservice

Definition. Specifies a pass through service.
Type. Structural
Superior Class. Service
OID. tbd
Naming. Common Name (cn)
Containment. Organization (O); Organizational Unit (OU)

1.1.5. proxyService

Definition. Specifies a Proxy Service.
Type. Structural
Superior Class. PassthroughService
Naming. Common Name (cn)
Containment. Organization (O); Organizational Unit (OU)
OID. tbd
Required Attributes. RadiusServer—Radius-server-address; auth-port; acct-port; shared-secret RADIUS attribute returned as "SRadius-server-address;auth-port;acct-port;shared-secret"

1.1.6. radiusProfileAux

Definition. This auxiliary class defines RADIUS attributes for a user or service. The RADIUS parameters can be specified at the group or user level. Settings applied at the group level apply to all the users that are members of that group. This applied to both implicit as well as explicit groups. Additionally the radiusProfileAux class can specify whether the settings apply to users or services when applied to a container.
Type. Auxiliary
Superior Class. top
OID. tbd
Naming. na
Containment. na
Allowed Attributes

| S. No. | Attribute | Description |
|---|---|---|
| 1. | idleTimeout | Specifies, in seconds, the maximum time a connection can remain idle. |
| 2. | sessionTimeout | Specifies, in seconds, the maximum length of the user's session. |
| 3. | radiusAttr | Specifies radius attributes |
| 4. | applicableClassRADIUS | Specifies the class this profile applies to. Valid values are user or Service. If this auxiliary class is added to a user or service this attribute may be absent. |

1.1.7. service

Definition. Specifies a service. This abstract class defines the attributes that are common for the following service types; pass through, transparent pass through and proxy. Service level access parameters, such as inACL, outACL, may be specified via the aclProfileAux auxiliary class. RADIUS attributes may be specified by using the radiusProfileAux class.

Type. Abstract
Superior Class. top
OID. tbd
Naming. Common Name (cn)
Containment. Organization (O); Organizational Unit (OU)
Required Attributes. ServiceRoute attribute specifies networks that exist for this service.
Allowed Attributes

| S. No. | Attribute | Description |
|---|---|---|
| 1. | nextHopGatewayKey | Specifies the next hop key for this service. |
| 2. | accessMode | Concurrent or Sequential |
| 3. | serviceType | Specifies the level of service. (check attribute). Must be outbound. (?) |
| 4. | primaryDNSServer | Specifies the primary DNS server (s) for this service. |
| 5. | secondaryDNSServer | Specifies the secondary DNS server (s) for this service. |
| 6. | domainName | Specifies domain names that get DNS resolution from the DNS server (s) specified in the dnsServerAddress attribute. |
| 7. | description | Provides a description of the service that is displayed to the user. |

1.1.8. servicegroup

Definition. Specifies a group of services.
Type. Structural
Superior Class. top
OID. tbd
Naming. Common Name (cn)
Containment. Organization (O); Organizational Unit (OU)
Allowed Attributes

| S. No. | Attribute | Description |
|---|---|---|
| 1. | memberServices | Specifies the services that are members of this group. |
| 2. | description | Provides a description for this service group. |

1.1.9. subordinateAccountAux

Definition. Specifies a subordinate account. Subordinate accounts are attached with the corresponding parent account. The privileges associated with these accounts are a subset of the privileges associated with the parent account. This auxiliary class is attached to all accounts created by a parent account.
Type. Auxiliary
Superior Class. top
OID. tbd
Naming. na
Containment. na
Allowed Attributes. ParentAccount attribute specifies the parent account.

1.1.10. subscriberAux

Definition. Defines a subscriber in the DESS framework. Subscribers may be individual users as well as groups. An object, such as a user, container or group in an existing directory, may be made a subscriber by adding the subscriber auxiliary class to it. Services "subscribed" to a group are also available to all users that are members of the group.
Type. Auxiliary
Superior Class. top
Naming. na
Containment. na
OID. tbd
Allowed Attributes

| S. No. | Attribute | Description |
|---|---|---|
| 1. | subscribedServices | DN of the service this user has subscribed to. The name may be a service name or a service group name. Service groups may be implicit (all services in a container or sub-tree) or explicit (services placed in a group object) |
| 2. | autoLogonService | Specifies parameters for services that the system will autologon the user to. This attribute is encoded in the following format: serviceName (cn); username; password |
| 3. | serviceFilter | Specifies that set of services that do not inherit for this subscriber. |

1.1.11. tunnelService

Definition. Specifies a tunnel service.
Type. Structural
Superior Class. Service
OID. tbd
Naming. Common Name (cn)
Containment. Organization (O); Organizational Unit (OU)
Allowed Attributes

| S. No. | Attribute | Description |
|---|---|---|
| 1. | tunnelID | Specifies the tunnel Id. |
| 2. | tunnelType | Specifies the tunnel type. For e.g., l2tp |
| 3. | tunnelIPAddress | Specifies the tunnel ip address |
| 4. | tunnelPassword | Specifies the tunnel password |

1.2. Attributes

1.2.1. accessMode

Description. Specifies the access mode for a service. Valid values are Sequential or Concurrent. The DESS RADIUS translator will encode this attribute (if needed) in the following format: MS or MC
Syntax. cis (single valued)
OID. tbd 1.2.2. applicableClassACL
Description. Specifies the class to which a particular Cisco ACL applies.
Syntax. cis (single valued)
OID. tbd
1.2.3. applicableClassRADIUS
Description. Specifies the class this profile applies to. Valid values are user or Service. If this auxiliary class is added to a user or service this attribute may be absent.
Syntax. cis (single valued)
OID. tbd
1.2.4. autoLogonService
Description. Specifies the parameters for services that the user should be logged on to automatically upon initial signon. This attribute is encoded in the following format:
<AUTOLOGONSERVICE>
  <SERVICENAME>Service Common Name</SERVICENAME>
  <USERNAME>User name</USERNAME>
  <PASSWORD>Password</PASSWORD>
</AUTOLOGONSERVICE>
The user must be subscribed to the service. Only the cn of the service is specified in the service name tag. The DN is computed dynamically by processing the list of subscribed services as specified in the serviceName attribute. The DESS RADIUS translator will encode this attribute in the following format:
AService Common Name;User Name;Password
Syntax. cis (multi valued)
OID. tbd
1.2.5. ciscoAVPair
Description. Specifies Cisco AV pair data used in user and service objects. This attribute is encoded in the following format:
<CISCOAVPAIR>
  <ATTRIBUTENAME>attribute name</ATTRIBUTENAME>
  <VALUE>value</VALUE>
</CISCOAVPAIR>
Note that DESS does not perform any data translation for this attribute. The application may choose to encode the values in any format desired. It is recommended that the data be encoded in XML. DESS will set and get the values as specified by the application without altering the values.
Syntax. cis (multi valued)
OID. tbd
1.2.6. description
Description. Provides the description for the associated object. The DESS RADIUS translator will encode this attribute (if needed) in the following format:
Idescription
Syntax. cis (single valued)
OID. tbd
1.2.7. domainName
Description. Specifies the domain names that get DNS resolution from the DNS servers specified in the dnsServerAddress attribute. The DESS RADIUS translator will encode this attribute (if needed) in the following format:
Oname1;name2;name3
Syntax. cis (multi valued)
OID. tbd 1.2.8. idleTimeout
Description
Specifies, in seconds, the maximum time a connection can remain idle.
Syntax. cis (single valued)
OID. tbd
1.2.9. memberServices
Description. Specifies the service/service groups that are members of this ServiceGroup object.
Syntax. dn (multi valued)
OID. tbd
1.2.10. nextHopGatewayEntry
Description. Associates next hop gateway keys with ip addresses. This attribute is encoded in the following format:
<NEXTHOPGATEWAYENTRY>
  <KEY>key</KEY>
  <ADDRESS>ip-address</ADDRESS>
</NEXTHOPGATEWAYENTRY>
The DESS RADIUS translator will encode this attribute (if needed) in the following format:
Gkey;ip-address
Syntax. cis (multi valued)
OID. tbd
1.2.11. nextHopGatewayKey
Description. Specifies the next hop key for a service. The DESS RADIUS translator will encode this attribute (if needed) in the following format:
Gkey
Syntax. cis (single valued)
OID. tbd
1.2.12. parentaccount
Description. Specifies the parent account for this account.
Syntax. dn (single valued)
OID. tbd
1.2.13. primaryDNSServer
Description. Specifies the primary DNS servers for this service. The DESS RADIUS translator will encode this attribute (combined with the secondaryDNSServer attribute) (if needed) in the following format:
Dprimary;secondary;secondary
Syntax. cis (multi valued)
OID. tbd
1.2.14. radiusAttr
Description. Specifies generic RADIUS AV pair data used in user and service objects. This attribute is encoded in the following format:
<RADIUS ATTRIBUTE>
  <ATTRIBUTENAME>attribute name</ATTRIBUTENAME>
  <VALUE>value</VALUE>
</RADIUS ATTRIBUTE>
Note that DESS does not perform any data translation for this attribute. The application may choose to encode the values in any format desired. It is recommended that the data be encoded in XML. DESS will set and get the values as specified by the application without altering the values.
Syntax. cis (multi valued)
OID. tbd
1.2.15. radiusServer
DESCRIPTION
Specifies the remote RADIUS server that the NRP—SSG will use to authenticate accesses to this proxy service. This attribute is encoded in the following format:
<RADIUSSERVER>
  <ADDRESS>radius-server-address</ADDRESS>
  <AUTHPORT>auth-port</AUTHPORT>

```
<ACCTPORT>acct-port<ACCTPORT>
   <SECRET>secret-key</SECRET>
</RADIUSSERVER>
```
The DESS RADIUS translator will encode this attribute (if needed) in the following format:
Sradius-server-address;auth-port;acct-port;secret-key
Syntax. cis (multi valued)
OID. tbd 1.2.16. secondaryDNSServer
Description. Specifies the secondary DNS servers for this service. The DESS RADIUS translator will encode this attribute (combined with the primaryDNSServer attribute) (if needed) in the following format:
Dprimary;secondary;secondary
Syntax. cis (multi valued)
OID. tbd 1.2.17. serviceFilter
Description. Specifies the list of services that are not inherited or blocked for a particular subscriber.
Syntax. dn (multi valued)
OID. tbd 1.2.18. serviceRoute
Description. Specifies networks that exist for this service. This attribute is encoded in the following format:
```
<SERVICEROUTE>
   <IPADDRESS>address</IPADDRESS>
   <MASK>mask</MASK>
</SERVICEROUTE>
```
The DESS RADIUS translator will encode this attribute (if needed) in the following format:
Raddress;mask
Syntax. cis (multi valued)
OID. tbd 1.2.19. serviceType
Description. Specifies the level of service. The DESS RADIUS translator does not translate this attribute.
Syntax. cis (single valued)
OID. tbd 1.2.20. sessionTimeout
Description. Specifies, in seconds, the maximum length of the user's session.
Syntax. cis (single valued)
OID. tbd 1.2.21. subordinateaccounts
Description. Specifies the list of subordinate accounts for a parent account.
Syntax. dn (multi valued)
OID. tbd 1.2.22. subscribedServices
Description. Specifies the distinguished name of a subscribed service. The name may specify a service or a service group. Service groups may be explicit (services added to a group object) or implicit (all services within a sub-tree context).
Syntax. dn (multi valued)
OID. tbd 1.2.23. tunnelID
Description. Specifies the tunnel ID. The DESS RADIUS translator will encode this attribute (if needed) in the following format:
vpdn:tunnel-id=tunnelID
Syntax. cis (single valued)
OID. tbd 1.2.24. tunnelIPAddress
Description. Specifies the tunnel ip address. The DESS RADIUS translator will encode this attribute (if needed) in the following format:
vpdn:ip-addresses=tunnelIPAddress
Syntax. cis (single valued)
OID. tbd 1.2.25. tunnelPassword
Description. Specifies the tunnel password. The DESS RADIUS translator will encode this attribute (if needed) in the following format:
vpdn:l2tp-tunnel-password=tunnelPassword
Syntax. cis (single valued)
OID. tbd 1.2.26. tunnelType
Description. Specifies the tunnel type. The DESS RADIUS translator will encode this attribute (if needed) in the following format:
vpdn:tunnel-type=tunnelType
Syntax. cis (single valued)
OID. tbd

What is claimed is:

1. A method of modifying a subscription of a subscriber to one or more telecommunications services based on subscriber information and service information that are stored in a directory repository, the method comprising the computer-implemented steps of:

determining whether the subscriber is currently logged in, and if the subscriber is not currently logged in, directing the subscriber to log in through an authentication server and generating, by an authorization service, a privilege token associated with the authenticated subscriber that includes subscriber privilege information, wherein said authorization service is separate from said authentication server;

receiving a modification request to modify the subscription of the subscriber to the one or more telecommunication services;

determining, based on subscriber privilege information in the privilege token associated with the subscriber generated by the authorization service, whether the subscriber has privileges sufficient to carry out the requested modification;

if the subscriber is determined to have sufficient privileges, then performing the steps of:

receiving, from the directory repository, first subscriber information and first service information representing only such services for which the subscriber is then currently subscribed;

modifying the first subscriber information and first service information to reflect the modification;

sending the modified information to the directory repository, resulting in creating and storing, in the directory repository, second service information that reflects the modification;

generating an engagement request to engage the telecommunications service for the subscriber in order to fulfill the modification request.

2. A method as recited in claim 1, wherein the authorization service generates the privilege token by the steps of:

receiving a user name associated with the subscriber and mapping the user name to a distinguished name in the directory repository;

creating and storing as subscriber privilege information in the privilege token one or more roles occupied by the subscriber based on role information that is stored in the directory repository, said stored role information including mapping information that maps a role to one or more privileges that specify which telecommunications services a subscriber having that role can subscribe to.

3. A method as recited in claim 1, wherein the step of determining whether the subscriber is currently logged in comprises determining whether a host object that uniquely identifies the subscriber exists, and wherein the privilege token associated with the subscriber is stored with the host object that uniquely identifies the subscriber.

4. A method as recited in claim 1, wherein the step of generating an engagement request comprises the steps of subscribing the subscriber to the service by creating and storing a relation of a subscriber object that programmatically represents the subscriber to a service object that programmatically represents the service, and creating and storing one or more attribute values in the relation, wherein the attribute values define the subscription.

5. A method of modifying subscriptions of a group of subscribers to one or more telecommunications services based on information stored in a directory repository, the method comprising the computer-implemented steps of:
receiving from an administrator of the group, a request to modify the subscriptions of the group of subscribers to the one or more telecommunications services;
determining, based on subscriber privilege information in a privilege token that is associated with the administrator and is generated by an authorization service, whether the administrator has privileges sufficient to carry out the requested modification;
if the administrator is determined to have sufficient privileges, then performing the steps of:
receiving, from the directory repository, current subscriber information and current service information representing then-current services to which the group of subscribers are subscribed;
modifying the subscriber information and the service information to reflect the modifications, resulting in creating and storing, in the directory repository, updated service information that reflects the modifications;
generating one or more requests to subscribe a telecommunications service to the group of subscribers to fulfill the request of the administrator.

6. A method as recited in claim 5, wherein the group of subscribers is defined explicitly by creating and storing a named group that contains one or more subscribers as group members.

7. A method as recited in claim 5, wherein the group of subscribers is defined implicitly such that the group comprises one or more subscribers in an object tree of the directory repository who are subordinate in the tree to a container node of the tree.

8. A method as recited in claim 5, further comprising the steps of subscribing one of the subscribers in the group to the telecommunications service by creating and storing a relation of a subscriber object that programmatically represents the subscriber to a service object that programmatically represents the telecommunications service, and creating and storing one or more attribute values in the relation, wherein the attribute values define the subscription.

9. A method of automatically logging in a subscriber to all telecommunications services subscribed to by the subscriber based on subscriber information and service information that are stored in a directory repository, the method comprising the computer-implemented steps of:
receiving a request from the subscriber to log in to the telecommunications services;
authenticating the subscriber by an authentication server;
generating a privilege token associated with the subscriber by an authorization service, said privilege token including subscriber privilege information, wherein said authorization service is separate from said authentication server;
determining whether the subscriber is allowed to automatically log into the telecommunication services, said determination based on subscriber privilege information in the privilege token associated with the subscriber;
if the subscriber is allowed to automatically log into the telecommunications services, receiving, from the directory repository, a list of all services for which the subscriber is then currently subscribed, and automatically logging the subscriber into all services identified in the list.

10. A method as recited in claim 9, wherein automatically logging the subscriber into all services identified in the list comprises the steps of:
for each of the services identified in the list:
obtaining service information that describes the services from the directory repository;
creating and storing a relation between a service object in the directory repository that uniquely identifies and represents each of the services and privileges of the subscriber, and a subscriber object that uniquely represents the subscriber.

11. A method as recited in claim 10, further comprising the steps of storing the privilege token in a service selection gateway for use in subsequent authorization processes relating to the subscriber.

12. A method of automatically subscribing a subscriber to a telecommunications service based on information stored in a directory repository, the method comprising the computer-implemented steps of:
receiving a request from the subscriber to obtain a list of available telecommunications services;
generating a list of only those telecommunications services for which the subscriber has privileges to subscribe to, based on privilege information and service information that is stored in the directory repository and associated with the subscriber, said privilege information associated with the subscriber specifying what telecommunications services the subscriber has privileges to subscribe to;
receiving a subscriber selection of one of the telecommunications services from the generated list of telecommunications services;
verifying that the subscriber has privileges that permit the subscriber to subscribe to the selected telecommunications service;
creating and storing updated subscription information in the directory repository;
generating a request to subscribe the subscriber to the selected telecommunications service based on the updated subscription information.

13. A method as recited in claim 12, wherein said privilege information associated with the subscriber is comprised of a privilege token for the subscriber that identifies a role of the subscriber, wherein the privileges of the subscriber to subscribe to a telecommunications service is determined by the role in the privilege token for the subscriber.

14. A method as recited in claim 12, wherein generating the list of only those telecommunications services for which the subscriber has privileges to subscribe to includes the step of generating and providing to the subscriber a custom display page that identifies only those telecommunications services for which the subscriber has privileges to subscribe to.

15. A computer-readable medium carrying one or more sequences of instructions for modifying a subscription of a subscriber to one or more telecommunications services based on subscriber information and service information that are stored in a directory repository, which instructions, when executed by one or more processors, cause the one or more processors to carry out the steps of:
  determining whether the subscriber is currently logged in, and if the subscriber is not currently logged in, directing the subscriber to log in through an authentication server and generating, by an authorization service, a privilege token associated with the authenticated subscriber that includes subscriber privilege information, wherein said authorization service is separate from said authentication server;
  receiving a modification request to modify the subscription of the subscriber to the one or more telecommunications services;
  determining, based on subscriber privilege information in the privilege token associated with the subscriber generated by the authorization service, whether the subscriber has privileges sufficient to carry out the requested modification;
  if the subscriber is determined to have sufficient privileges, the one or more sequences of instructions which, when executed, further cause the one or more processors to carry out the steps of:
    receiving, from the directory repository, first subscriber information and first service information representing only such services for which the subscriber is then currently subscribed;
    modifying the first subscriber information and first service information to reflect the modification;
    sending the modified information to the directory repository, resulting in creating and storing, in the directory repository, second service information that reflects the modification;
    generating an engagement request to engage the telecommunications service for the subscriber in order to fulfill the modification request.

16. An apparatus for modifying a subscription of a subscriber to one or more telecommunications services based on subscriber information and service information that are stored in a directory repository, comprising:
  means for determining whether the subscriber is currently logged in, and if the subscriber is not currently logged in, means for directing the subscriber to log in through an authentication server and means for generating a privilege token associated with the authenticated subscriber by an authorization service, said privilege token including subscriber privilege information, wherein said authorization service is separate from said authentication server;
  means for receiving a modification request to modify the subscription of the subscriber to the one or more telecommunications services;
  means for determining, based on subscriber privilege information in the privilege token associated with the subscriber generated by the authorization service, whether the subscriber has privileges sufficient to carry out the requested modification;
  means for receiving, from the directory repository, first subscriber information and first service information representing only such services for which the subscriber is then currently subscribed;
  means for modifying the first subscriber information and first service information to reflect the modification;
  means for sending the modified information to the directory repository, resulting in creating and storing, in the directory repository, second service information that reflects the modification;
  means for generating an engagement request to engage the telecommunications service for the subscriber in order to fulfill the modification request.

17. An apparatus for modifying a subscription of a subscriber to one or more telecommunications services based on subscriber information and service information that are stored in a directory repository, comprising:
  a network interface that is coupled to a data network that includes the directory repository for receiving information therefrom;
  a processor;
  one or more stored sequences of instructions which, when executed by the processor, cause the processor to carry out the steps of:
    determining whether the subscriber is currently logged in, and if the subscriber is not currently logged in, directing the subscriber to log in through an authentication server and generating, by an authorization service, a privilege token associated with the authenticated subscriber that includes subscriber privilege information, wherein said authorization service is separate from said authentication server;
    receiving a modification request to modify the subscription of the subscriber to the one or more telecommunications services;
    determining, based on subscriber privilege information in the privilege token associated with the subscriber that is generated by the authorization service, whether the subscriber has privileges sufficient to carry out the requested modification;
    if the subscriber is determined to have sufficient privileges, the one or more sequences of instructions which, when executed, further cause the processor to:
      receiving, from the directory repository, first subscriber information and first service information representing only such services for which the subscriber is then currently subscribed;
      modifying the first subscriber information and first service information to reflect the modification;
      sending the modified information to the directory repository, resulting in creating and storing, in the directory repository, second service information that reflects the modification;
      generating an engagement request to engage the telecommunications service for the subscriber in order to fulfill the modification request.

18. A method of modifying a subscription of a subscriber to a telecommunications service based on information stored in a directory repository, the method comprising the computer-implemented steps of:
  receiving a request to identify one or more services to which the subscriber is subscribed, based on a prior request to modify the subscription of the subscriber to the telecommunications service;
  generating a list of the one or more services to which the subscriber is currently subscribed, based on group membership of the subscriber, one or more roles occupied by the subscriber, and authorization information associated with the subscriber that is stored in the directory repository, wherein said one or more roles are mapped to one or more privileges that specify which telecommunications services a subscriber having that role can subscribe to;

generating individual service information for each of the one or more services in the list, based on subscriber information and service information that is stored in the directory repository, for use in automatically subscribing the subscriber to a service that is represented by the individual service information.

19. A computer-readable medium carrying one or more sequences of instructions for modifying a subscription of a subscriber to a telecommunications service based on information stored in a directory repository, which instructions, when executed by one or more processors, cause the one or more processors to carry out the steps of:

receiving a request to identify one or more services to which the subscriber is subscribed, based on a prior request to modify the subscription of the subscriber to the telecommunications service;

generating a list of the one or more services to which the subscriber is currently subscribed, based on group membership of the subscriber, one or more roles occupied by the subscriber, and authorization information associated with the subscriber that is stored in the directory repository, wherein said one or more roles are mapped to one or more privileges that specify which telecommunications services a subscriber having that role can subscribe to;

generating individual service information for each of the one or more services in the list, based on subscriber information and service information that is stored in the directory repository, for use in automatically subscribing the subscriber to a service that is represented by the individual service information.

20. An apparatus for modifying a subscription of a subscriber to a telecommunications service based on information stored in a directory repository, comprising:

means for receiving a request to identify one or more services to which the subscriber is subscribed, based on a prior request to modify the subscription of the subscriber to the telecommunications service;

means for generating a list of the one or more services to which the subscriber is currently subscribed, based on group membership of the subscriber, one or more roles occupied by the subscriber, and authorization information associated with the subscriber that is stored in the directory repository, wherein said one or more roles are mapped to one or more privileges that specify which telecommunications services a subscriber having that role can subscribe to;

means for generating individual service information for each of the one or more services in the list, based on subscriber information and service information that is stored in the directory repository, for use in automatically subscribing the subscriber to a service that is represented by the individual service information.

21. An apparatus for modifying a subscription of a subscriber to a telecommunications service based on information stored in a directory repository, comprising:

a directory-enabled service selection framework that is coupled to the directory repository for receiving stored information therefrom;

a processor;

one or more stored sequences of instructions in the framework which, when executed by the processor, cause the processor to carry out the steps of:

receiving a request to identify one or more services to which the subscriber is subscribed, based on a prior request to modify the subscription of the subscriber to the telecommunications service;

generating a list of the one or more services to which the subscriber is currently subscribed, based on group membership of the subscriber, one or more roles occupied by the subscriber, and authorization information associated with the subscriber that is stored in the directory repository, wherein said one or more roles are mapped to one or more privileges that specify which telecommunications services a subscriber having that role can subscribe to;

generating individual service information for each of the one or more services in the list, based on subscriber information and service information that is stored in the directory repository, for use in automatically subscribing the subscriber to a service that is represented by the individual service information.

22. An apparatus for modifying subscriptions of a group of subscribers to one or more telecommunications services based on information stored in a directory repository, comprising:

a network interface that is coupled to a data network that includes the directory repository for receiving information therefrom;

a processor; and one or more stored sequences of instructions which, when executed by the processor, cause:

receiving from an administrator of the group, a request to modify the subscriptions of the group of subscribers to the one or more telecommunications services;

determining, based on subscriber privilege information in a privilege token that is associated with the administrator and is generated by an authorization service, whether the administrator has privileges sufficient to carry out the requested modifications; and if the administrator is determined to have sufficient privileges, then performing the steps of:

receiving, from the directory repository, current subscriber information and current service information representing then-current services to which the group of subscribers are subscribed;

modifying the subscriber information and the service information to reflect the modifications, resulting in creating and storing, in the directory repository, updated service information that reflects the modifications; and generating one or more requests to subscribe a telecommunications service to the group of subscribers to fulfill the request of the administrator.

23. An apparatus as recited in claim 22, wherein the group of subscribers is defined explicitly by creating and storing a named group that contains one or more subscribers as group members.

24. An apparatus as recited in claim 22, wherein the group of subscribers is defined implicitly such that the group comprises one or more subscribers in an object tree of the directory repository who are subordinate in the tree to a container node of the tree.

25. An apparatus as recited in claim 22, wherein the one or more stored sequences of instructions further comprise instructions which, when executed by the processor cause subscribing one of the subscribers in the group to the telecommunications service by creating and storing a relation of a subscriber object that programmatically represents the subscriber to a service object that programmatically represents the telecommunications service, and creating and storing one or more attribute values in the relation, wherein the attribute values define the subscription.

26. An apparatus for modifying subscriptions of a group of subscribers to one or more telecommunications services based on information stored in a directory repository, comprising:

means for receiving from an administrator of the group, a request to modify the subscriptions of the group of subscribers to the one or more telecommunications services;

means for determining, based on subscriber privilege information in a privilege token that is associated with the administrator and is generated by an authorization service, whether the administrator has privileges sufficient to carry out the requested modification;

means for receiving, from the directory repository, current subscriber information and current service information representing then-current services to which the group of subscribers are subscribed;

means for modifying the subscriber information and the service information to reflect the modifications, resulting in creating and storing, in the directory repository, updated service information that reflects the modifications; and means for generating one or more requests to subscribe a telecommunications service to the group of subscribers to fulfill the request of the administrator.

27. An apparatus as recited in claim 26, wherein the group of subscribers is defined explicitly by creating and storing a named group that contains one or more subscribers as group members.

28. An apparatus as recited in claim 26, wherein the group of subscribers is defined implicitly such that the group comprises one or more subscribers in an object tree of the directory repository who are subordinate in the tree to a container node of the tree.

29. An apparatus as recited in claim 26, further comprising means for subscribing one of the subscribers in the group to the service by creating and storing a relation of a subscriber object that programmatically represents the subscriber to a service object that programmatically represents the service, and means for creating and storing one or more attribute values in the relation, wherein the attribute values define the subscription.

30. An apparatus for automatically logging in a subscriber to all telecommunications services subscribed to by the subscriber based on subscriber information and service information that are stored in a directory repository, comprising:

a network interface that is coupled to a data network that includes the directory repository for receiving information therefrom;

a processor; and one or more stored sequences of instructions which, when executed by the processor, cause:

receiving a request from the subscriber to log in to the telecommunications services;

authenticating the subscriber by an authentication server;

generating a privilege token associated with the subscriber by an authorization service, said privilege token including subscriber privilege information, wherein said authorization service is separate from said authentication server;

determining whether the subscriber is allowed to automatically log into the telecommunication services, said determination based on subscriber privilege information in the privilege token associated with the subscriber; and if the subscriber is allowed to automatically log into the telecommunications services, receiving, from the directory repository, a list of all services for which the subscriber is then currently subscribed, and automatically logging the subscriber into all services identified in the list.

31. An apparatus as recited in claim 30, wherein the instructions that cause automatically logging the subscriber into all services identified in the list further comprise instructions which, when executed by the processor, cause for each of the services identified in the list:

obtaining service information that describes the services from the directory repository; and creating and storing a relation between a service object in the directory repository that uniquely identifies and represents each of the services and privileges of the subscriber, and a subscriber object that uniquely represents the subscriber.

32. An apparatus as recited in claim 30, wherein the one or more stored sequences of instructions further comprise instructions which, when executed by the processors, cause storing the privilege token in a service selection gateway for use in subsequent authorization processes relating to the subscriber.

33. An apparatus for automatically logging in a subscriber to all telecommunications services subscribed to by the subscriber based on subscriber information and service information that are stored in a directory repository, comprising:

means for receiving a request from the subscriber to log in to the telecommunications services;

means for authenticating the subscriber by an authentication server;

means for generating a privilege token associated with the subscriber by an authorization service, said privilege token including subscriber privilege information, wherein said authorization service is separate from said authentication server;

means for determining whether the subscriber is allowed to automatically log into the telecommunication services, said determination based on subscriber privilege information in the privilege token associated with the subscriber; and means for receiving, from the directory repository, a list of all services for which the subscriber is then currently subscribed when the subscriber is allowed to automatically log into the telecommunications services, and means for automatically logging the subscriber into all services identified in the list.

34. An apparatus as recited in claim 33, wherein the means for automatically logging the subscriber into all services identified in the list comprises:

means for obtaining service information that describes the services from the directory repository for each of the services identified in the list; and means for creating and storing a relation between a service object in the directory repository that uniquely identifies and represents each of the services and privileges of the subscriber, and a subscriber object that uniquely represents the subscriber.

35. An apparatus as recited in claim 33, further comprising means for storing the privilege token in a service selection gateway for use in subsequent authorization processes relating to the subscriber.

36. An apparatus for automatically subscribing a subscriber to a telecommunications service based on information stored in a directory repository, comprising:

a network interface that is coupled to a data network that includes the directory repository for receiving information therefrom;

a processor; and one or more stored sequences of instructions which, when executed by the processor, cause:

receiving a request from the subscriber to obtain a list of available telecommunications services;

generating a list of only those telecommunications services for which the subscriber has privileges to subscribe to, based on privilege information and service information that is stored in the directory repository and is associated with the subscriber, said privilege information associated with the subscriber specifying what telecommunications services the subscriber has privileges to subscribe to;

receiving a subscriber selection of one of the telecommunications services from the generated list of telecommunications services;

verifying that the subscriber has privileges that permit the subscriber to subscribe to the selected telecommunications service;

creating and storing updated subscription information in the directory repository; and generating a request to subscribe the subscriber to the selected telecommunications service based on the updated subscription information.

37. An apparatus as recited in claim 36, wherein said privilege information associated with the subscriber comprises a privilege token for the subscriber that identifies a role of the subscriber, wherein the privileges of the subscriber to subscribe to a telecommunications service is determined by the role in the privilege token for the subscriber.

38. An apparatus as recited in claim 36, wherein the instructions that cause generating the list of only those telecommunications services for which the subscriber has privileges to subscribe to include instructions which, when executed by the processor, cause generating and providing to the subscriber a custom display page that identifies only those telecommunications services for which the subscriber has privileges to subscribe to.

39. An apparatus for automatically subscribing a subscriber to a telecommunications service based on information stored in a directory repository comprising:

means for receiving a request from the subscriber to obtain a list of available telecommunications services;

means for generating a list of only those telecommunications services for which the subscriber has privileges to subscribe to, based on privilege information and service information that is stored in the directory repository and is associated with the subscriber, said privilege information associated with the subscriber specifying what telecommunications services the subscriber has privileges to subscribe to;

means for receiving a subscriber selection of one of the telecommunications services from the generated list of telecommunications services;

means for verifying that the subscriber has privileges that permit the subscriber to subscribe to the selected telecommunications service;

means for creating and storing updated subscription information in the directory repository; and means for generating a request to subscribe the subscriber to the selected telecommunications service based on the updated subscription information.

40. An apparatus as recited in claim 39, wherein said privilege information associated with the subscriber comprises a privilege token for the subscriber that identifies a role of the subscriber, wherein the privileges of the subscriber to subscribe to a telecommunications service is determined by the role in the privilege token for the subscriber.

41. An apparatus as recited in claim 39, wherein the means for generating the list of only those telecommunications services for which the subscriber has privileges to subscribe to includes means for generating and providing to the subscriber a custom display page that identifies only those telecommunications services for which the subscriber has privileges to subscribe to.

42. An apparatus as recited in claim 16, wherein the means for generating the privilege token by the authorization service comprise:

means for receiving a user name associated with the subscriber and mapping the user name to a distinguished name in the directory repository; and means for creating and storing as subscriber privilege information in the privilege token one or more roles occupied by the subscriber based on role information that is stored in the directory repository, said stored role information including mapping information that maps a role to one or more privileges that specify which telecommunications services a subscriber having that role can subscribe to.

43. An apparatus as recited in claim 16, wherein the means for determining whether the subscriber is currently logged in comprise means for determining whether a host object that uniquely identifies the subscriber exists, wherein the privilege token associated with the subscriber is stored with the host object that uniquely identifies the subscriber.

44. An apparatus as recited in claim 16, wherein the means for generating the engagement request comprise means for subscribing the subscriber to the service by creating and storing a relation of a subscriber object the programmatically represents the subscriber to a service object that programmatically represents the service, and creating and storing one or more attribute values in the relation, wherein the attribute values define the subscription.

45. An apparatus as recited in claim 17, wherein the instructions that cause generating the privilege token by the authorization service comprise:

instructions which, when executed by the processor, cause receiving a user name associated with the subscriber and mapping the user name to a distinguished name in the directory repository; and instructions which, when executed by the processor, cause creating and storing as subscriber privilege information in the privilege token one or more roles occupied by the subscriber based on role information that is stored in the directory repository, said stored role information including mapping information that maps a role to one or more privileges that specify which telecommunications services a subscriber having that role can subscribe to.

46. An apparatus as recited in claim 17, wherein the instructions that cause determining whether the subscriber is currently logged in comprise instructions which, when executed by the processor, cause determining whether a host object that uniquely identifies the subscriber exists, wherein the privilege token associated with the subscriber is stored with the host object that uniquely identifies the subscriber.

47. An apparatus as recited in claim 17, wherein the instructions that cause generating an engagement request comprise instructions which, when executed by the processor, cause subscribing the subscriber to the service by creating and storing a relation of a subscriber object that programmatically represents the subscriber to a service object that programmatically represents the service, and creating and storing one or more attribute values in the relation, wherein the attribute values define the subscription.

\* \* \* \* \*

UNITED STATES PATENT AND TRADEMARK OFFICE
CERTIFICATE OF CORRECTION

PATENT NO. : 7,197,125 B1 Page 1 of 1
APPLICATION NO. : 09/800646
DATED : March 27, 2007
INVENTOR(S) : Ranjan Prasad et al.

It is certified that error appears in the above-identified patent and that said Letters Patent is hereby corrected as shown below:

On the cover page, item [75] Inventors   Delete "Max Lou" and insert --Shuxian Lou--

Signed and Sealed this

Ninth Day of September, 2008

JON W. DUDAS
*Director of the United States Patent and Trademark Office*